Figure 1:
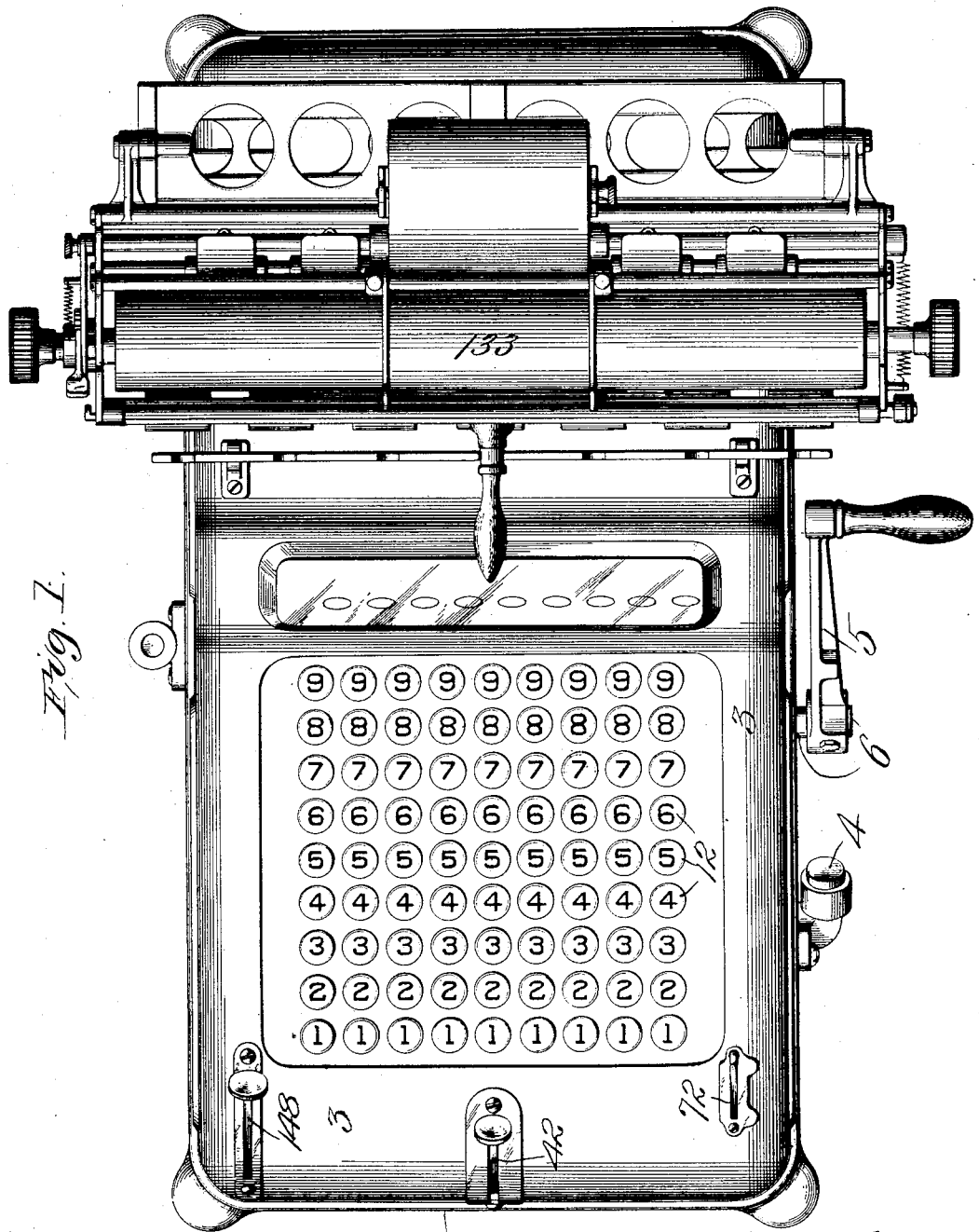

No. 751,207. PATENTED FEB. 2, 1904.
F. C. RINSCHE.
CALCULATING MACHINE.
APPLICATION FILED MAY 2, 1902.
NO MODEL. 16 SHEETS—SHEET 1.

Witnesses:
Inventor:
Frank C. Rinsche
by Bakewell & Cornwall
attys

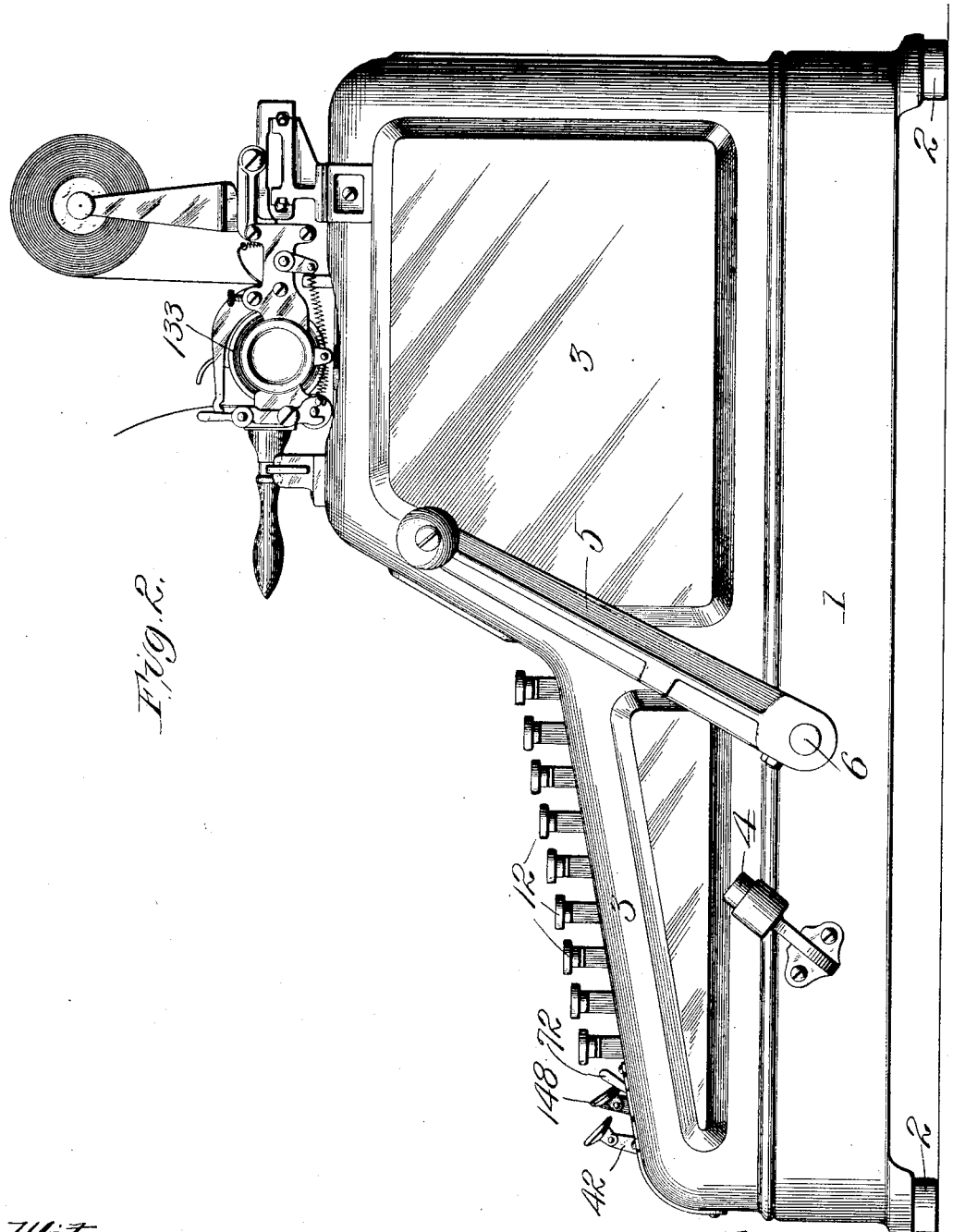

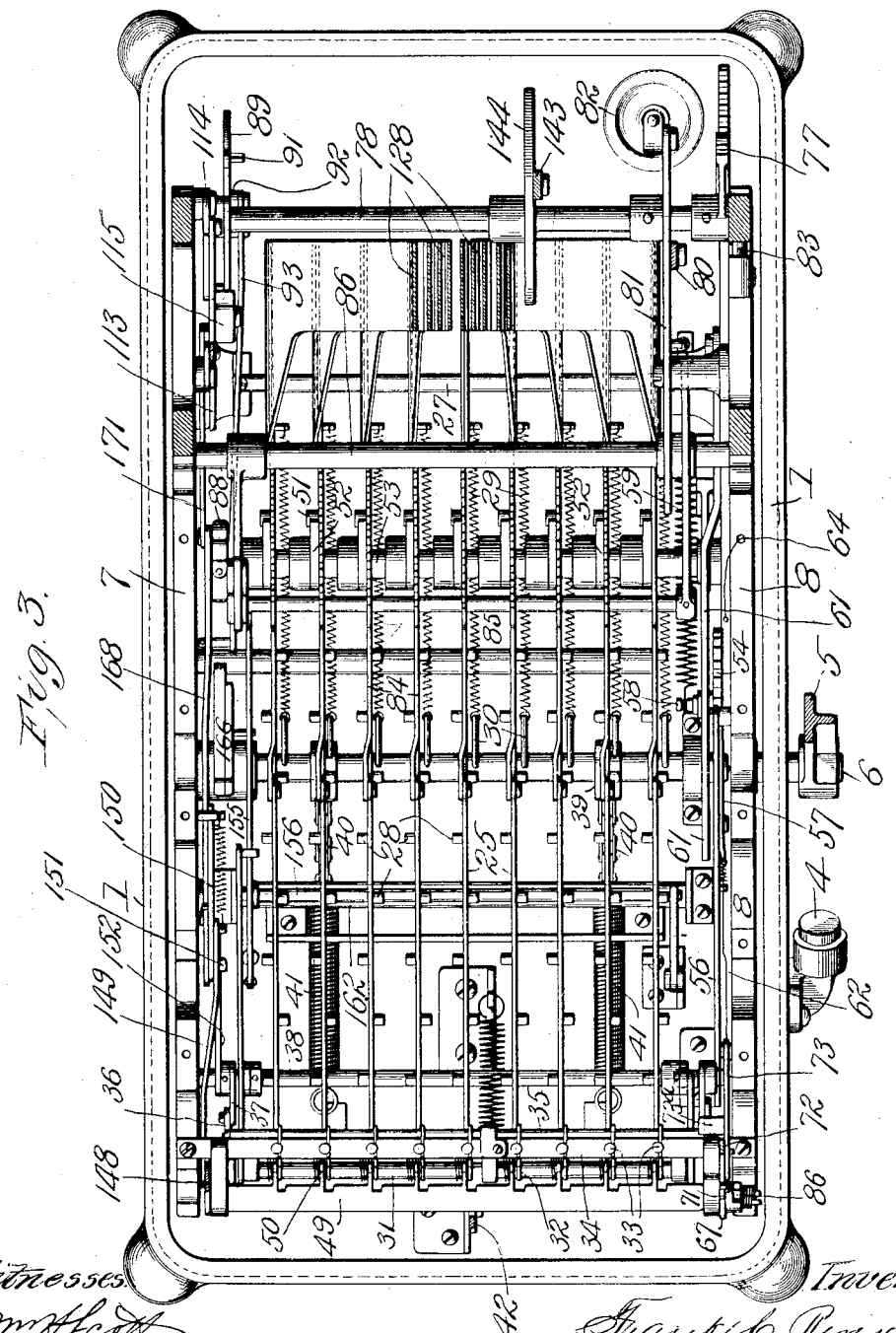

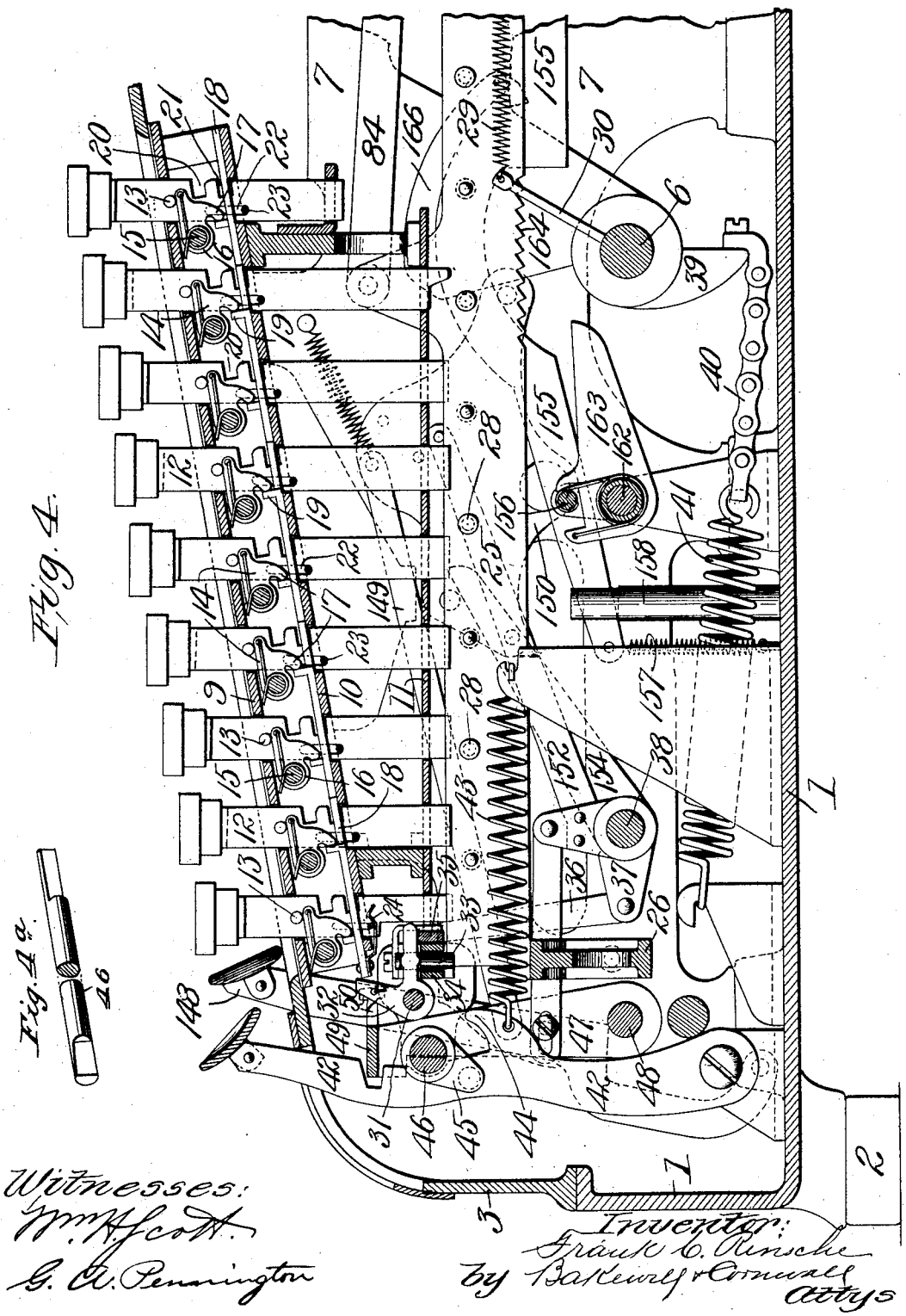

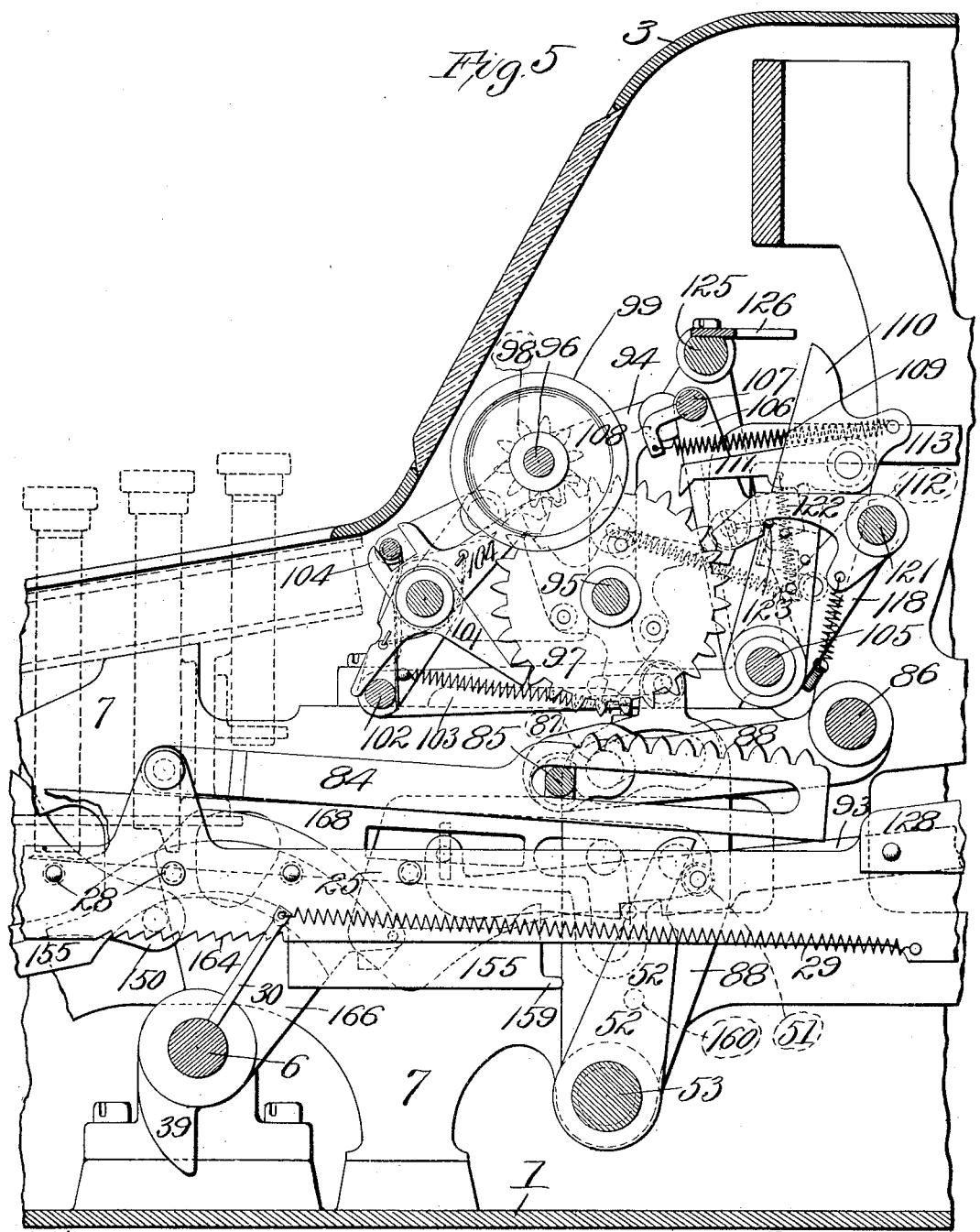

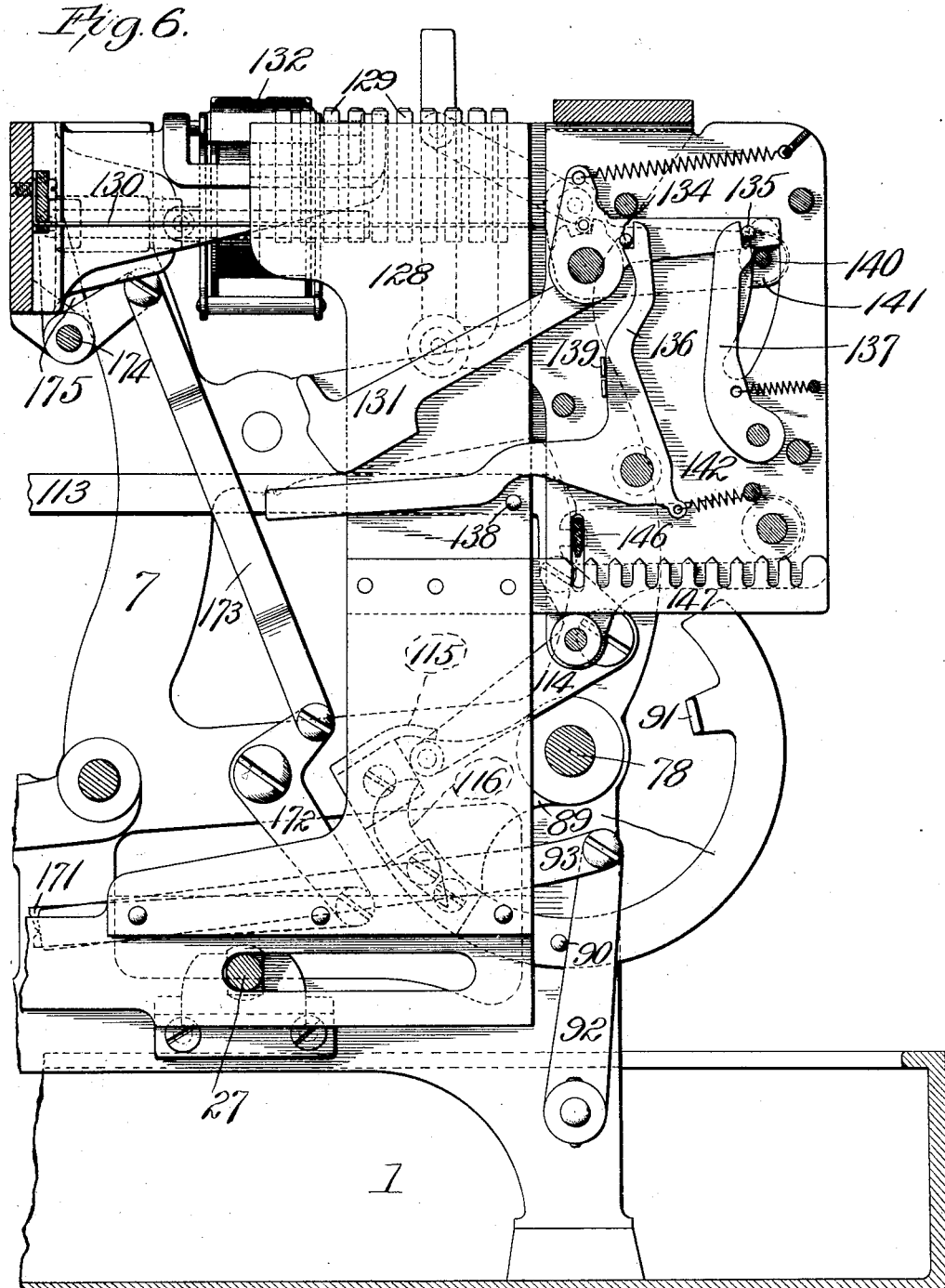

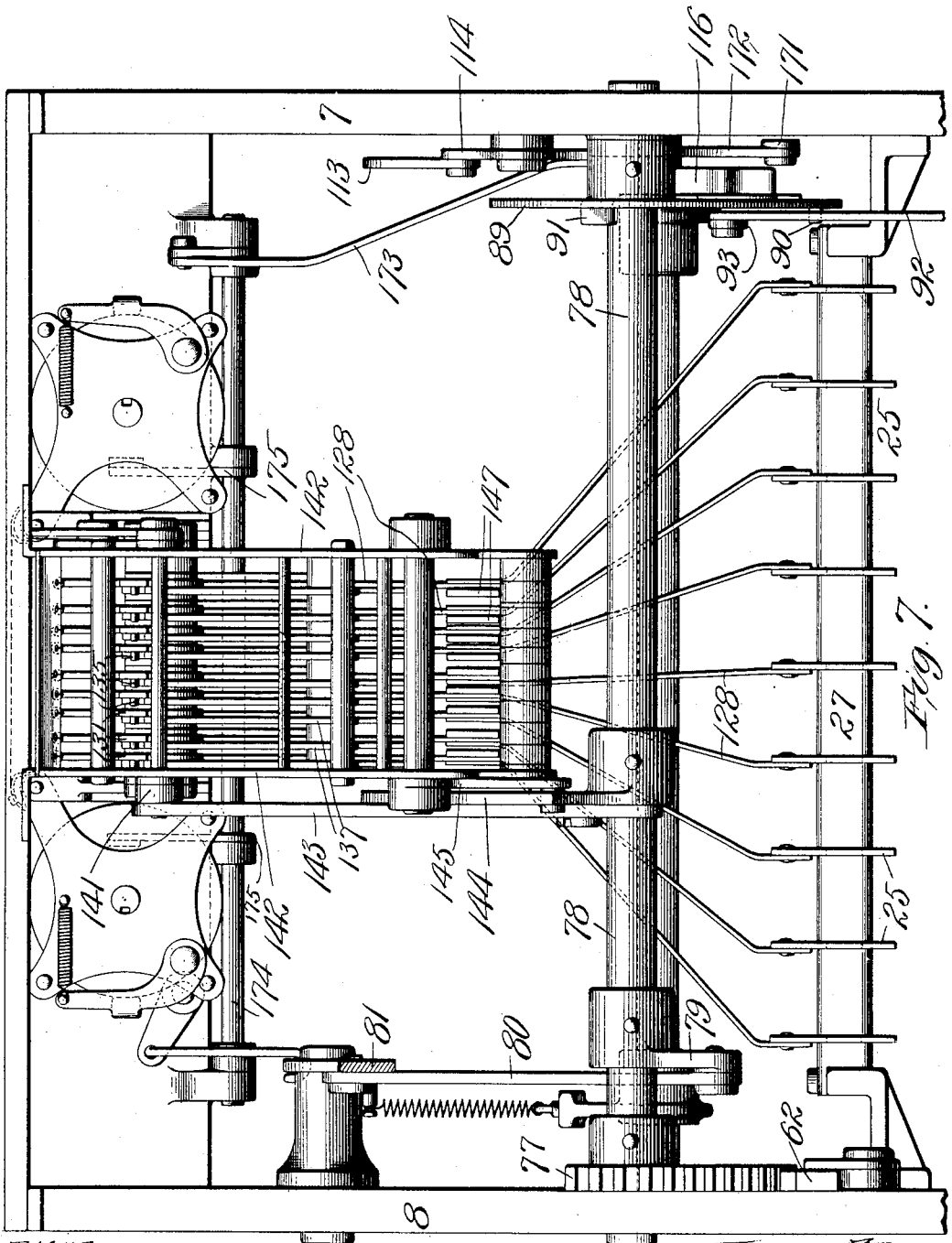

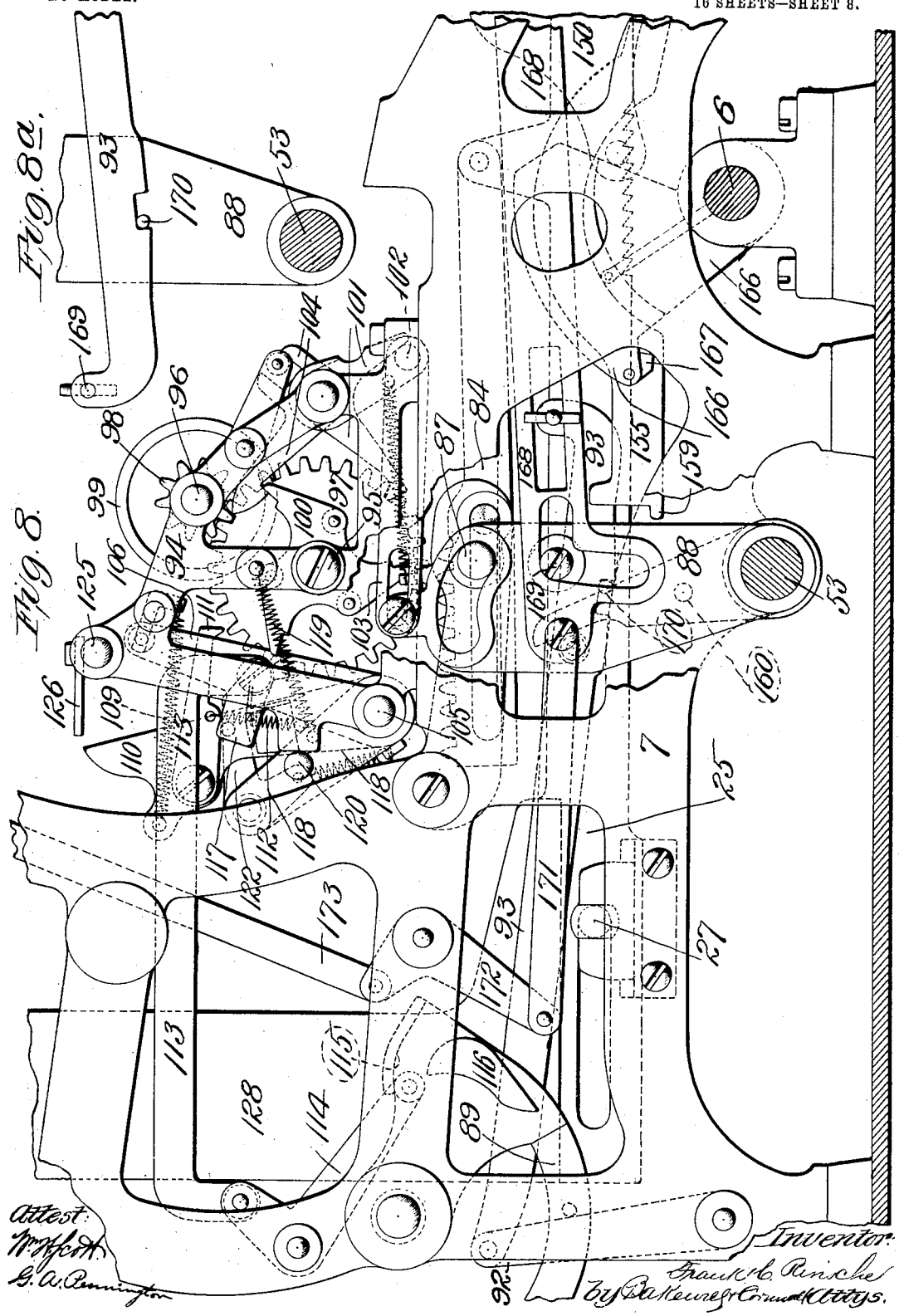

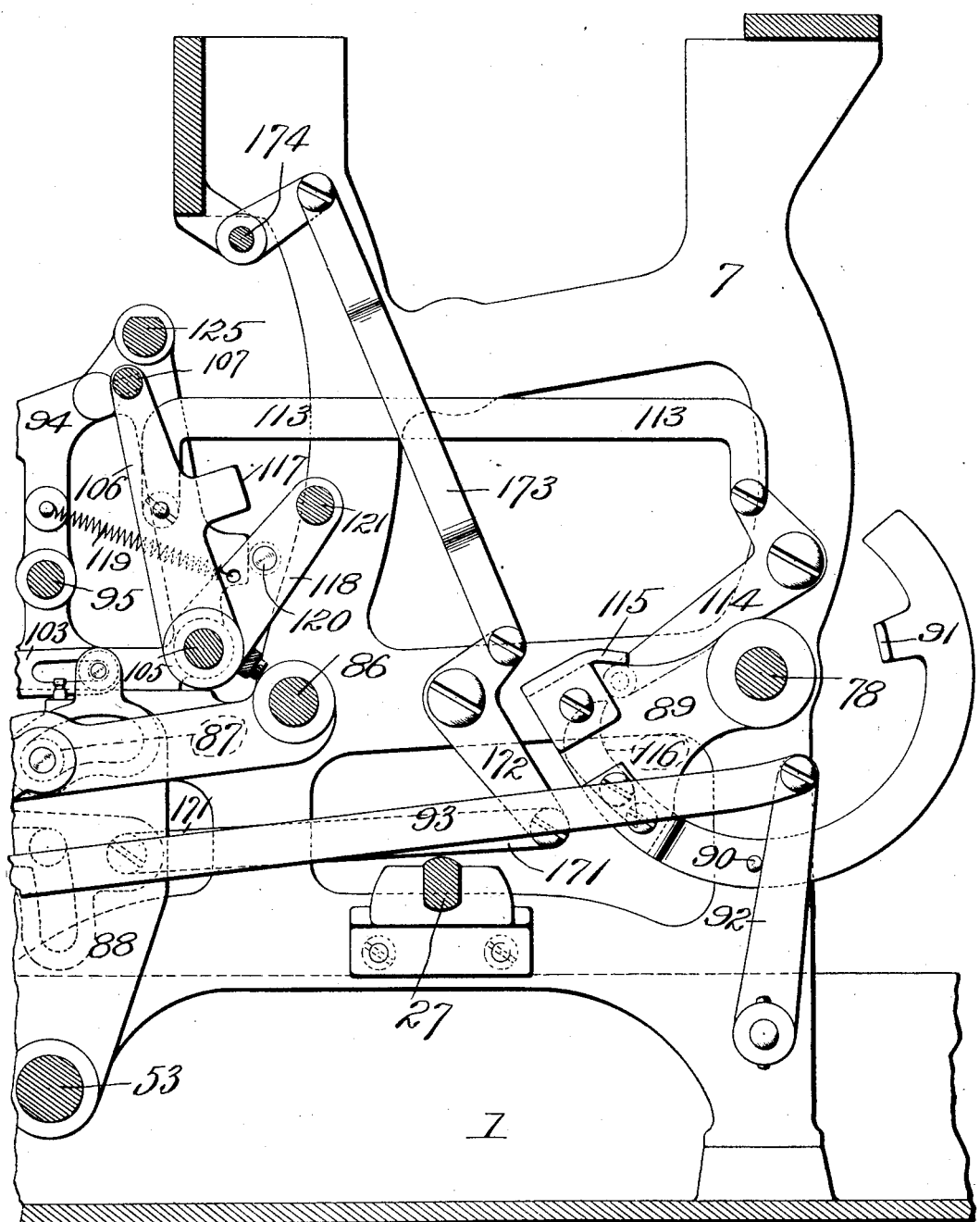

No. 751,207. PATENTED FEB. 2, 1904.
F. C. RINSCHE.
CALCULATING MACHINE.
APPLICATION FILED MAY 2, 1902.
NO MODEL. 16 SHEETS—SHEET 10.

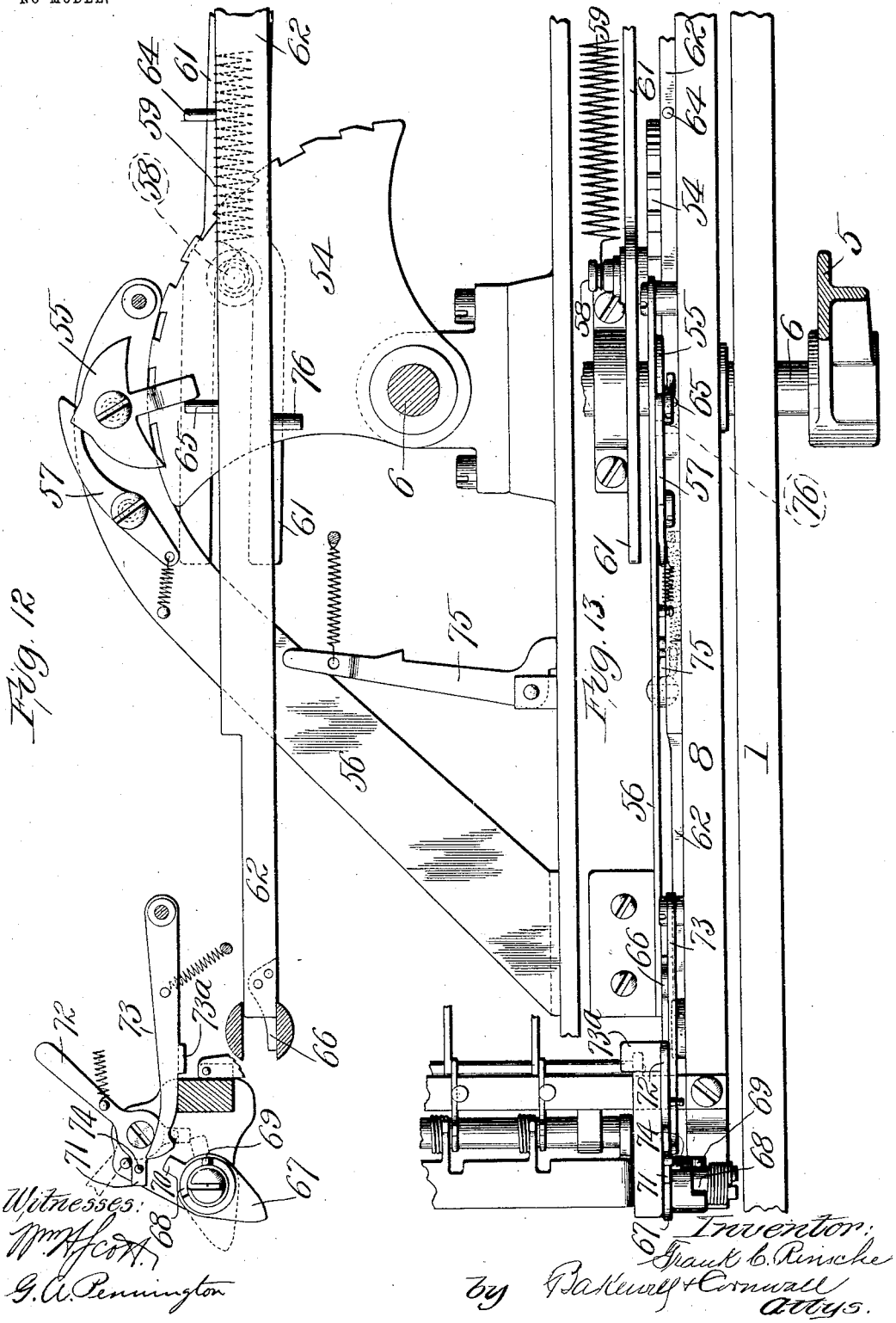

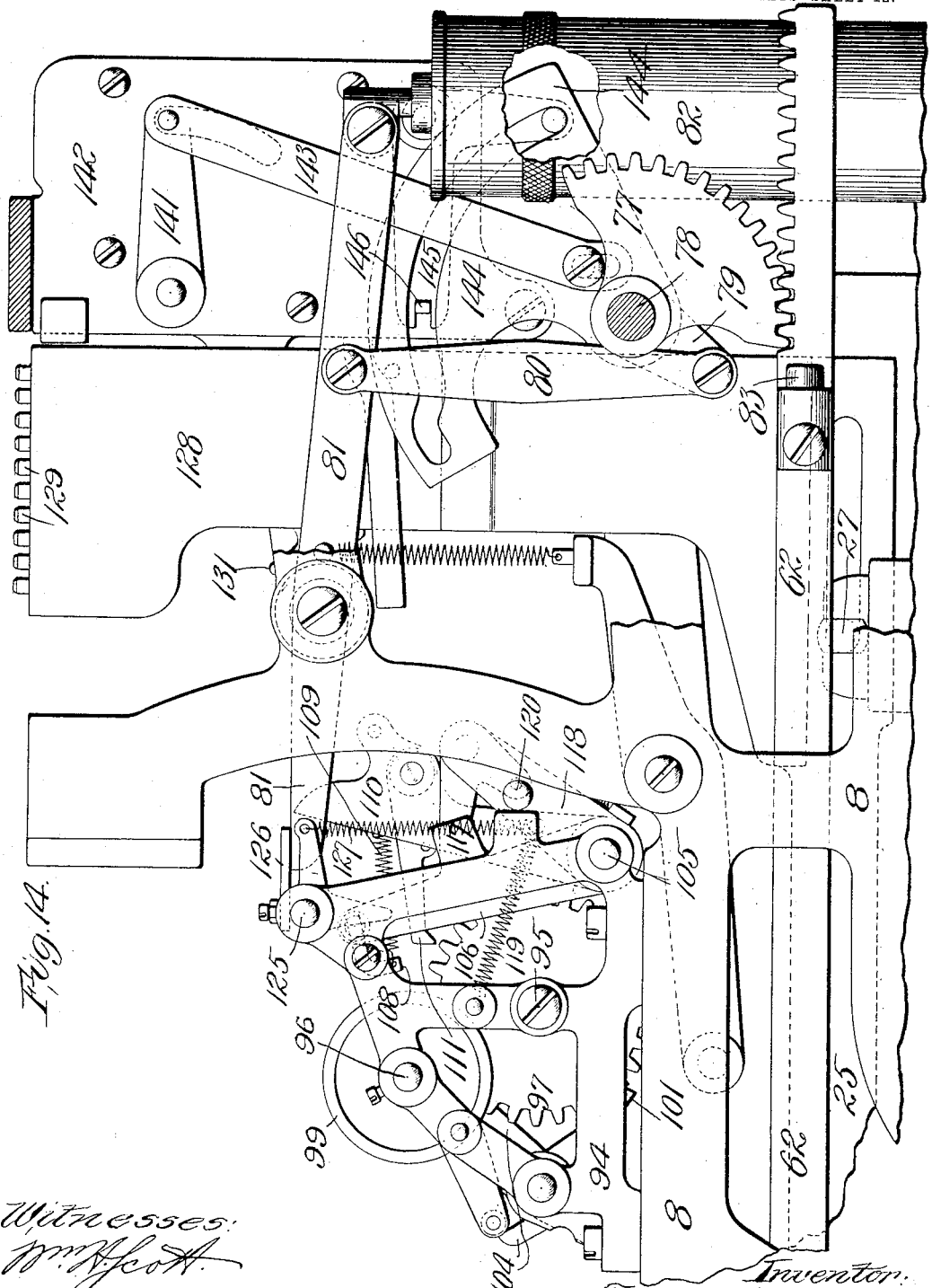

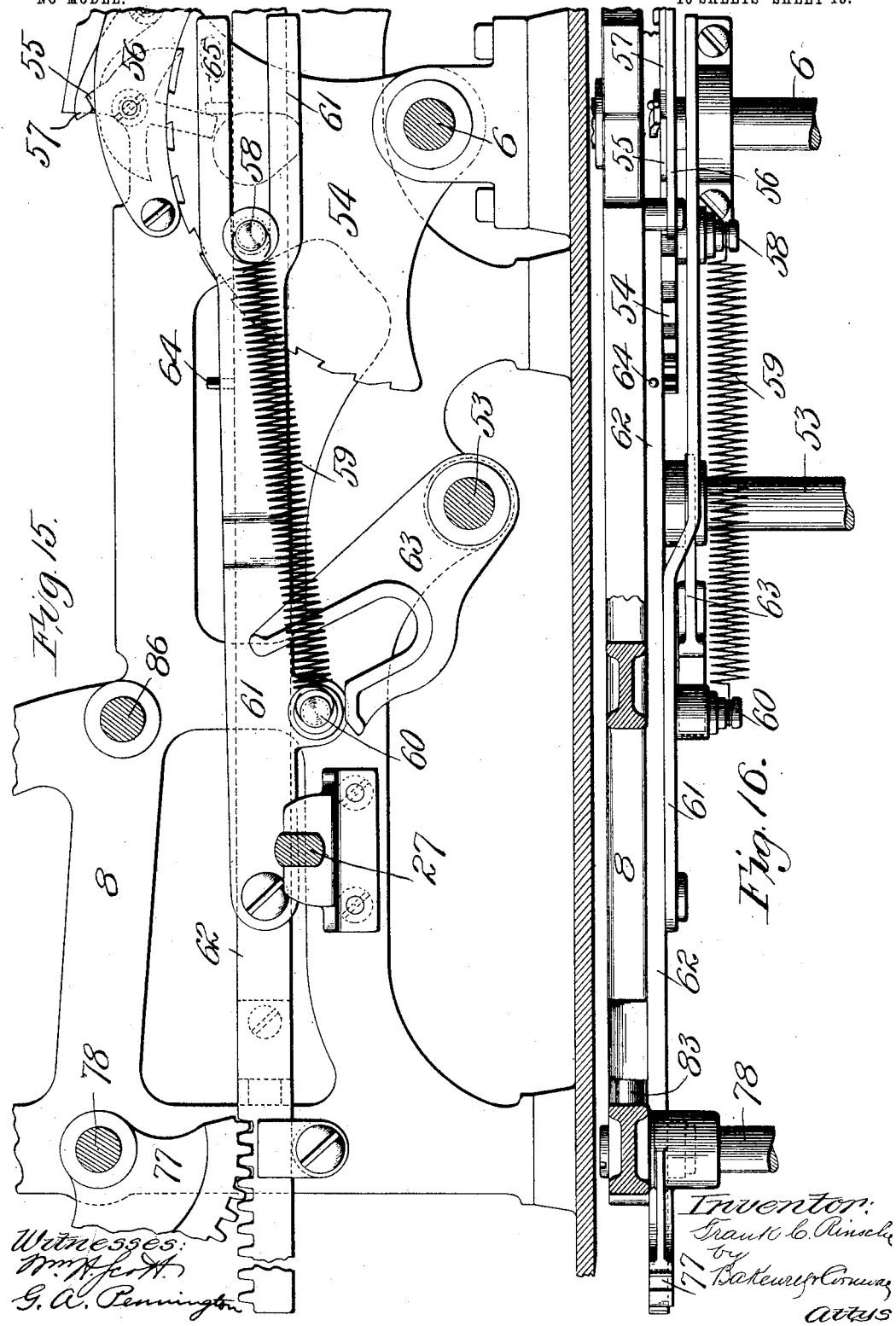

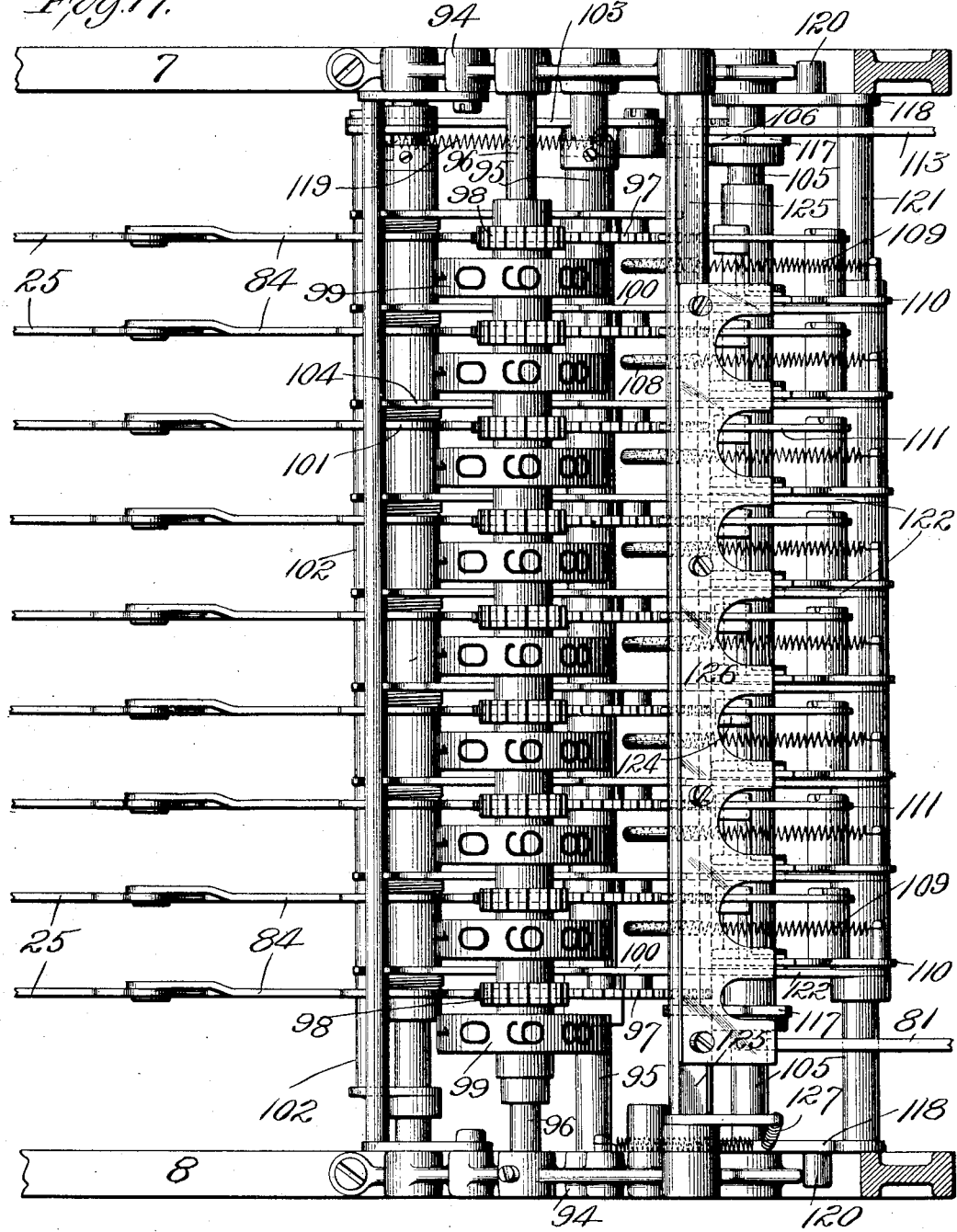

No. 751,207. PATENTED FEB. 2, 1904.
F. C. RINSCHE.
CALCULATING MACHINE.
APPLICATION FILED MAY 2, 1902.
NO MODEL. 16 SHEETS—SHEET 15.
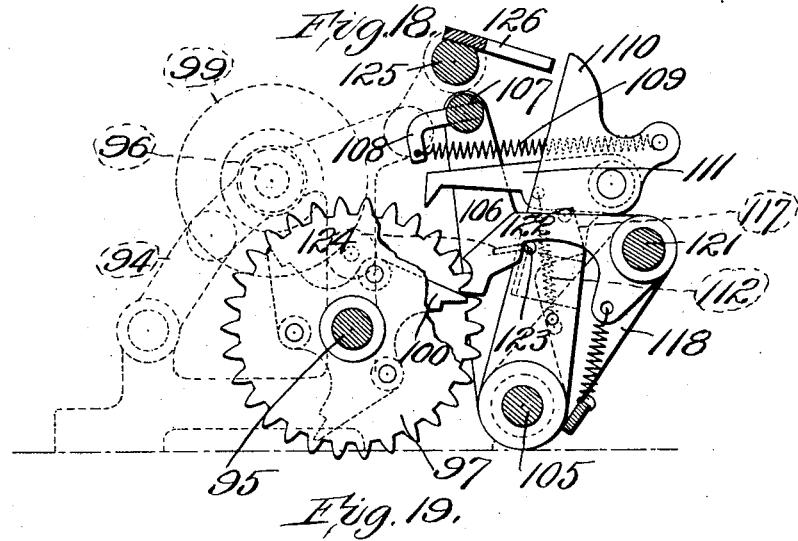
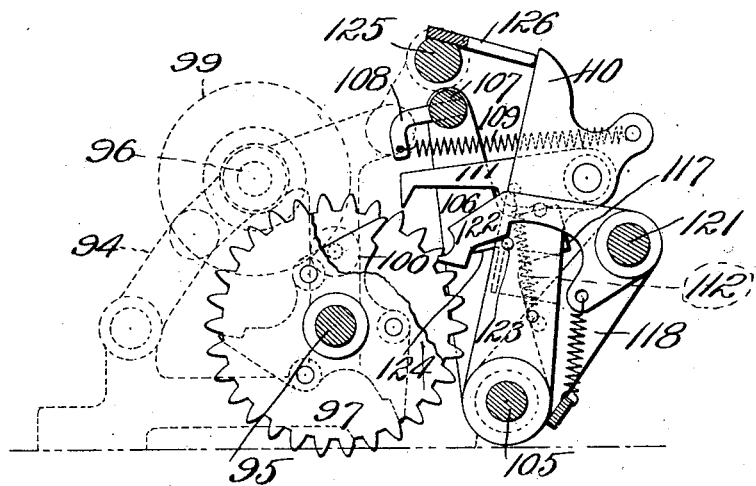
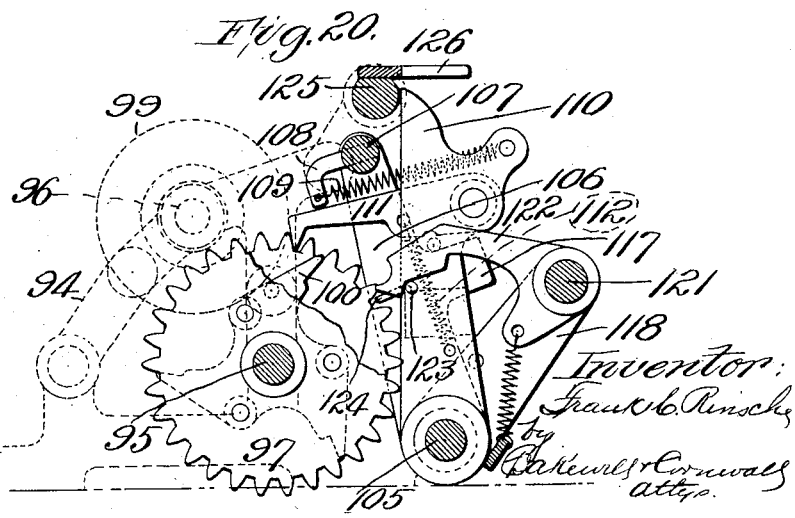

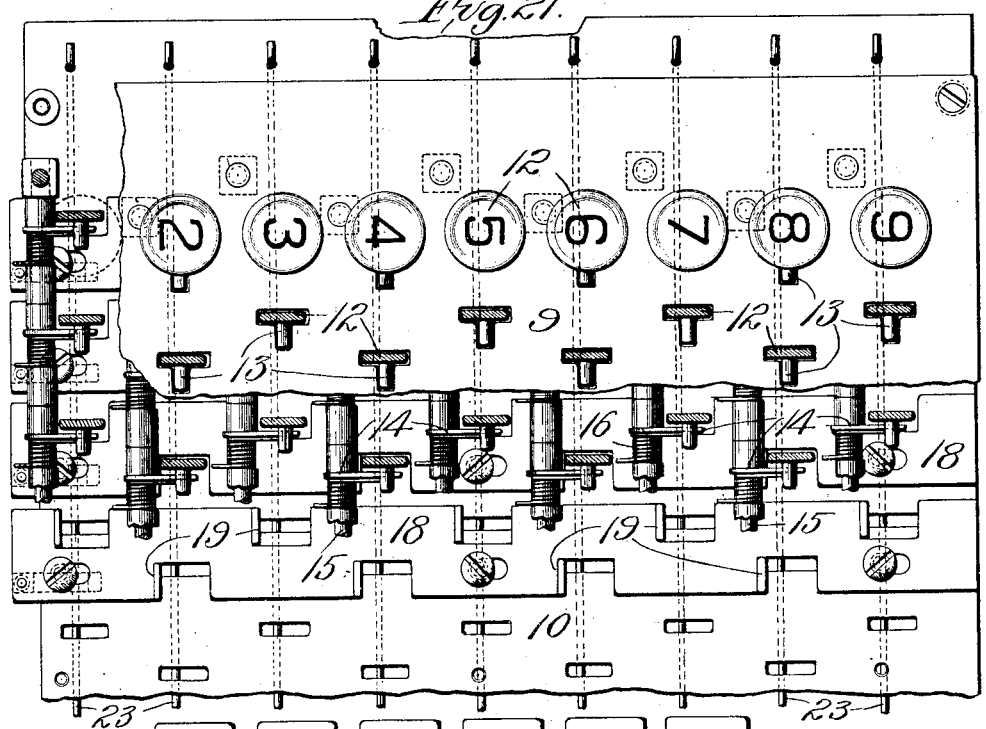
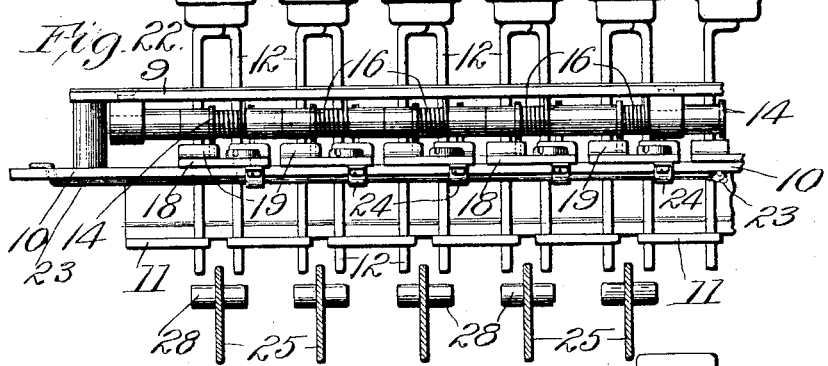
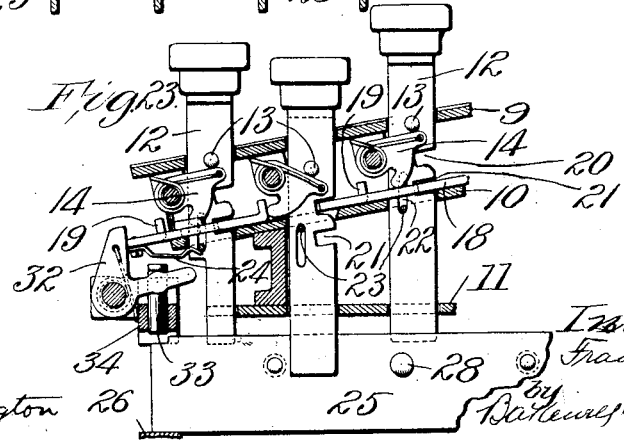

No. 751,207. Patented February 2, 1904.

UNITED STATES PATENT OFFICE.

FRANK C. RINSCHE, OF ST. LOUIS, MISSOURI, ASSIGNOR TO UNIVERSAL ACCOUNTANT MACHINE COMPANY, OF ST. LOUIS, MISSOURI, A CORPORATION OF MISSOURI.

CALCULATING-MACHINE.

SPECIFICATION forming part of Letters Patent No. 751,207, dated February 2, 1904.

Application filed May 2, 1902. Serial No. 105,581. (No model.)

*To all whom it may concern:*

Be it known that I, FRANK C. RINSCHE, a citizen of the United States, residing at St. Louis, Missouri, have invented a certain new and useful Improvement in Calculating-Machines, of which the following is a full, clear, and exact description, such as will enable others skilled in the art to which it appertains to make and use the same, reference being had to the accompanying drawings, forming part of this specification, in which—

Figure 1 is a top plan view. Fig. 2 is a side elevational view. Fig. 3 is a top plan view with the casing and part of the mechanism removed. Fig. 4 is a vertical sectional view through the front end of the machine, showing the keyboard. Fig. 4ª is a detail view of one of the rock-shafts. Fig. 5 is a vertical sectional view through the central portion of the machine, showing the adding mechanism. Fig. 6 is a vertical sectional view through the rear end of the machine, showing the printing mechanism. Fig. 7 is a rear elevational view of the machine. Fig. 8 is an elevational view of the rear portion of the machine as seen from the left-hand side, part of the framing being broken away to more clearly show the interior mechanism. Fig. 8ª is a detail view showing the inner face of one of the rock-arms and a slot-and-pin connection of a lever therewith. Fig. 9 is a sectional view looking from the opposite side and showing some of the parts appearing in Fig. 8. Fig. 10 is an elevational view of the mechanism adjacent the frame-plate at the left-hand side of the machine, said view being seen from the left with the frame-plate removed. Fig. 11 is a top plan view of the mechanism shown in Fig. 10. Fig. 12 is an elevational view of mechanism adjacent the frame-plate at the right side of the machine, the near frame-plate being removed. Fig. 13 is a top plan view of the same. Fig. 14 is a side elevational view of the mechanism at the rear portion of the machine as seen from the right-hand side thereof, part of the frame-plate being removed. Fig. 15 is a sectional view looking toward the frame-plate at the right side of the machine, showing a part of the mechanism in elevation. Fig. 16 is a top plan view thereof. Fig. 17 is a top plan view of the adding mechanism. Figs. 18, 19, and 20 are sectional views through the adding mechanism, showing the transferring devices in different positions. Fig. 21 is a plan view of a portion of the keyboard, said view being partly in horizontal section. Fig. 22 is a front elevational view of the keyboard; and Fig. 23 is a vertical longitudinal sectional view through the keyboard, showing one of the keys depressed.

This invention relates to a new and useful improvement in calculating-machines of that type shown and described in United States Letters Patent No. 654,181, granted to me July 24, 1900.

My present invention consists in the construction, arrangement, and combination of the several parts, all as will hereinafter be described and afterward pointed out in the claims.

*The casing.*—1 indicates the base-casting, preferably supported by cushions 2, upon which casting is arranged a casing 3, provided with suitable openings, through which project certain parts of the machine, as will hereinafter appear. The casting 1 is provided with a support carrying a buffer 4 for arresting and cushioning the operating-handle 5, which is manipulated at each operation of the machine. This handle is mounted upon a drive-shaft 6, journaled in the casting 1.

7 and 8 indicate castings, which are lightened at appropriate points and are provided with bearings for the several shafts of the machine, said castings forming frame-plates. For the sake of distinction I will refer to the casting 7 as the frame-plate at the left-hand side of the machine and to the casting 8 as the frame-plate at the right-hand side of the machine.

*The keyboard.*—The keyboard is removably supported upon the forward ends of the right and left hand frame-plates. This keyboard consists of top plate 9, intermediate plate 10, and a bottom plate 11, said plates being provided with openings for guiding the shanks of the keys 12 in their movements. Suitable spacing-posts are provided between these plates 9, 10, and 11. Each key-shank has a lateral pin or projection 13, which engages a rocking lever 14, pivoted upon a rod 15, extending transversely the keyboard. This rod carries a coiled torsion-spring 16 for each of the levers 14, whereby said levers are normally held in an elevated position. Spacing collars or washers are interposed between the levers to hold them in proper position with respect to their associate key-shanks. Each lever 14 is provided with a depending heel portion 17, which coöperates with a projection extending from a sliding plate. There is a sliding plate common to each series of keys, there being nine keys in a series, the heads of said keys bearing numerals from "1" to "9," inclusive. The key-shanks of a series are preferably staggered, as shown in Figs. 21 and 22, and the sliding plate referred to, which is indicated at 18, is recessed on each side opposite the key-shanks of a series. The projections with which the heel portions of the levers 14 coöperate are indicated at 19 and are preferably formed by bending up a portion of the sliding plate at the front edge of the recess through which the key-shank passes. Each key-shank is provided with two notches 20 and 21, the former of which is located in a plane above the sliding plate, while the latter is in the plane of the sliding plate and when said key-shank is operated is designed to receive the sliding plate, whereby the key is locked in its elevated position.

To prevent vertical displacement of the keys, each key-shank is slotted, as at 22, through which slot passes a wire or rod 23, arranged under the plate 10.

24 indicates a leaf-spring secured to the under side of the sliding plate at its forward end, which leaf-spring is provided at its inner end with two inclined faces designed to coöperate with the foremost rod or wire 23, whereby when the sliding plate is in its normal position, as shown in Fig. 4, the leaf-spring prevents any accidental displacement thereof, and when said sliding plate is moved forwardly, as by the depression of a key in its series, as shown in Fig. 23, said leaf-spring prevents said sliding plate from being restored to its home position without the application of sufficient force to overcome the friction between the leaf-spring and its coöperating rod.

In operation the keys are held normally in an elevated position by the springs 16. When a key is depressed, the heel of lever 14 positively drives the sliding plate forward, the operated key becoming locked in its depressed position when the recess or notch 20 engages the sliding plate. The sliding plate will enter the notches 21 of all the other keys in that series and lock them against operation during such time as the operated key remains depressed. When the sliding plate is restored to normal position, the operated key is permitted to rise and fall and all of the keys in that series are unlocked in readiness for operation.

*The slide-bars.*—25 indicates what I term "slide-bars," which slide-bars are guided in their movement by a cross-frame 26, located at the front end of the machine, (see Fig. 4,) and by a cross-rod 27, located at the rear end of the machine. (See Fig. 6.) These slide-bars are provided with stops 28, projecting from both sides thereof, (see Fig. 3,) which stops coöperate with the lower ends of the key-shanks. Thus when any key is depressed the lower end of its shank is placed in the path of movement of its coöperating stop, and upon the release of the slide-bar said slide-bar will move forwardly until arrested by its stop coming in contact with the depressed key. There is no stop on the slide-bar for coöperating with the "9" key, because when the "9" key is depressed the slide-bar moves forwardly to the full limit, as determined by the rear wall of the slot through which the bar 27 passes. However, when any of the keys from "1" to "8" are depressed the stops on the slide-bar coöperate therewith, and in this manner the slide-bar is arrested in one of nine different positions, depending upon the position of the key operated.

Each slide-bar has connected to it a spring 29, whose energy is constantly exerted to move said slide-bar forwardly. The forward end of each spring 29 is mounted upon a rock-arm 30, extending from the main shaft 6. In this manner whenever the handle 5 is operated an increased tension is placed on the springs 29. Springs 29 are preferably made of light wire and are designed to drive the slide-bars forwardly to their point of arrest. Should these springs become weak from constant usage, the rocking of the main shaft will place an increased tension therein sufficient to move the slide-bars to their desired position upon the forward movement of the handle and before the slide-bars are engaged with other parts of the machine.

*Releasing the slide-bars.*—31 indicates a shaft extending transversely the machine, upon which shaft are pivoted a series of bell-crank levers 32. These bell-crank levers have their vertical members in the paths of movement of their respective sliding plates, while their horizontal members coöperate with pins 33, slidably mounted in a cross-bar 34. Whenever a sliding plate 18 is driven forwardly by the depression of a key, its coöperating bell-crank lever 32 is rocked and the pin 33 raised out of engagement with a shoulder on the forward end of its coöperating slide-bar, thus releasing said slide-bar, which slide-bar under the action of its impelling-spring will be moved forwardly until its stop contacts with the lower end of the depressed key.

*Simultaneous release of the slide-bars.*—In the ordinary operation of setting up an example on the key-board only those slide-bars are released which are identified with the columns in which the operated keys are located. In the operation of taking a total, which will hereinafter be more fully described, one of the steps necessary is the release of all of the slide-bars. To effect this release, I provide means actuated from the total-key for disengaging the pins 33 from the slide-bars, and this is accomplished by simultaneously operating all of the levers 32 through the medium of a bar 35, extending transversely the machine under the inner ends of said levers. This bar 35 (see Figs. 4 and 10) is supported upon arms 36, which arms are pivotally connected to rock-arms 37, mounted upon a cross-shaft 38, extending transversely the machine. Means are provided for rocking this shaft 38 at each operation of the total-key, and consequently when the inner ends of the levers 32 are elevated all of the slide-bars are released.

Suitable springs are connected to the levers 32 for restoring them to normal position.

*Restoring the operating-handle.*—Referring to Fig. 4, it will be observed that the main shaft 6 is provided with a cam projection 39, to which is mounted a chain 40, having one end connected to a spring 41. When the operating-handle is pulled forwardly, power is stored in springs 41, there being preferably two of such springs coöperating with the main shaft, (see Fig. 3,) said power becoming effective to rock the shaft reversely and move the handle rearwardly when said handle is released by the operator. In this rearward movement of the handle the items set up on the keyboard are stored in the adding-wheels.

*Clearing the keyboard.*—In the event an example is set up on the keyboard and it is desired to clear said keyboard without placing said example in the adding-wheels it is only necessary to pull forward a handle or lever 42, located at the forward end of the machine and which is preferably provided with a button or head on its upper end. This lever is held in its inner or rearmost position by means of a spring 43. Lever 42 is provided with a cam projection 44, which coöperates with a rock-arm 45, extending laterally from a rock-shaft 46, whose ends are flattened, as shown by dotted lines in Fig. 4, said flattened ends forming cam-faces which coöperate with and rock the frame 47, mounted upon shaft 48, the upper cross-bar of which frame (indicated at 49) being provided with a series of inwardly-extending fingers or projections 50, which lie in the plane of the sliding plates. The projection 45 is preferably located in advance of the vertical plane of the axis of the shaft 46, so that the forward movement of lever 42 will rock the shaft 46 slightly, placing the cam 44 in front of the projection 45. Such movement is insufficient to restore the sliding plates.

On the return or backward movement of the lever 42 the projection 45 is struck by the cam projection 44 of the lever and the rock-shaft is forced to rotate approximately one-quarter of a revolution, which causes the fingers 50 to move inwardly and restore the sliding plates before the cam 44 reaches the limit of its backward movement. The projection 45 is released and returns to normal position in front of said cam projection 44. Means are provided for operating this frame 47 upon the operation of the total-key and also upon the operation of the operating-handle. The total-key coöperates with frame 47 to lock the keyboard against actuation when the total-key is in other than a normal position, and the operating-handle coöperates with frame 47 on its return movement to release the keyboard and restore the same to normal position ready for another operation.

*Restoring the slide-bars.*—Each of the slide-bars is provided with a lateral projection, preferably in the form of a roller 51, (see Fig. 5,) with which coöperates rock-arms 52, mounted upon shaft 53. In normal position these arms are such that the slide-bars are normally held in their rearward position notwithstanding the release of said slide-bars. However, upon the operation of the handle the shafts 6 and 53 are rocked forward, the movement of the former placing increased tension in the springs 29 and the movement of the latter permitting the slide-bars to move forward, the pins 51 hugging the arms 52 until the slide-bars are arrested in their movement by the stops carried thereby. Upon the return movement of the operating-handle the arms 52 pick up the slide-bars and restore them to normal position, in which normal position they are caught and held by the latch-pins 33 until the bell-crank levers 32, controlling said latch-pins, are again actuated. In this manner while the slide-bars are impelled forwardly under the action of motor-springs such movement is restrained by the restoring devices until the operating-handle is actuated, and upon the actuation of said operating-handle the restoring devices only permit the slide-bars to move forwardly at a speed determined by the actuating-handle or the cushioning devices connected with the same. In view of the above the slide-bars and stops carried thereby will not be subjected to any violent shocks or jars due to the impelling action of this spring, but will only be permitted to move gently to their forward positions.

*Compelling a full operation of the handle.*—Referring now to Figs. 12 and 15, 54 indicates a sector mounted on the main shaft 6, preferably adjacent the right-hand frame-plate. This sector is notched in its periphery, with which coöperates a double-acting pawl 55, mounted upon an overhanging arm 56. This pawl is substantially T-shaped, the biting edges thereof being formed on the ends of the cross member, while the vertical member provides a tappet by which the pawl is thrown from one position to the other. A centering-pawl 57 is arranged upon the overhang 56, said centering-pawl coöperating with a triangular projection extending upwardly from the double pawl 55. At each operation of the operating-handle the sector 54 is vibrated, and the pawl 55 being set properly its biting edge will enter the notches of the sector upon the initial movement of the handle and prevent the handle from being restored to its home position, except that the movement of said handle is continued and on making a full stroke the extreme forward limit of movement of the handle setting in operation devices which will reverse the position of the pawl 55 and cause the other biting edge to coöperate with the sector. Thus upon the return movement of the handle the pawl being reversed will prevent said handle from being moved forwardly until after the handle has reached a full home position and the parts of the machine are wholly restored.

*Yielding drive from the main shaft.*—The sector 54 carries a pin 58, forming a spring-post, to which is connected one end of a spring 59, the other end of said spring being mounted in a post 60, carried by a lever 61. Lever 61 is pivotally secured to a sliding rod 62, which rod is guided in its horizontal movement by appropriate devices. The forward end of lever 61 is slotted to receive the post 58, the spring 59 tending to hold said post in the bottom of said slot at all times. When the operating-handle is pulled forwardly with a sudden movement, the post 58 will leave the bottom of its slot, and through the tension of spring 59 the lever 61 and its carrying-rod 62 will follow, the speed of such motion, however, depending upon the stretch of the spring 59. In this manner the operating-handle is not directly connected to the shaft 53, and consequently the mechanism driven by said shaft 53 is not susceptible to violent shocks or jars on the forward movement of the handle, but rather to the gentle action of a spring, in the event that the handle is jerked. In the ordinary operation of the machine the spring 59 is stiff enough to hold the post 58 against the bottom wall of the slot.

Shaft 53 carries an arm 63, which is provided with an open-ended slot in its upper end, one of the side walls of which is removed to receive the post 60. In the normal position of the parts post 60 is located above the shortened side wall, and consequently the shaft 53, which carries the restoring-arms 52, cannot be rocked except when the post 60 is displaced. The operating-handle is the only medium which can displace the post 60, and in moving the same forwardly said post not only releases the restoring-arms 52, but also contacts with the long wall of the slot in arm 63 and by such engagement causes said arm 63 to be rocked forwardly. The operating-handle by this construction has an initial movement before the restoring-arms are released and operated, also the final return movement of the operating-handle continues after the restoring-arms have reached home position.

*Operating the double pawl.*—Referring to Fig. 12, it will be seen that the rod 62, which practically extends throughout the length of the machine, carries pins or projections 64 and 65. When rod 62 is moved forwardly, pin 64 engages the tappet of the double pawl and reverses it, so as to cause said pawl to become operative upon the return movement of the handle. Upon the backward movement of rod 62 the pin 65 engages the tappet and sets the double pawl in proper position to be operative when the handle is being moved forwardly.

*Releasing the keyboard from the operating-handle.*—The forward end of rod 62 is provided with a cam-block 66, which in the forward movement of the rod is designed to pass under a tappet 67, arranged on the end of shaft 46. This tappet is yieldingly mounted upon shaft 46 and is provided with a slot 68 for coöperating with a pin 69 on said rod. The forward movement of rod 62 idly rocks the tappet 67. When said tappet is located behind the block 66, the backward movement of rod 62 will, through the positive connection between the tappet and the shaft 46, rock said shaft 46, causing the restoring-fingers 50, carried by the rocking frame 47, to engage and restore all of the sliding plates 18, releasing the depressed keys, which results in restoring the keyboard to normal position. It will be observed that this restoration of the keyboard does not occur until the handle has completed its forward stroke and is well on its return or backward stroke.

*The repeating-key.*—70 indicates a projection extending upwardly from the tappet 67, which projection lies in the path of an arm 71, extending from a repeating-key 72. Whenever the repeating-key is moved forwardly, the said arm engages the said projection and elevates the tappet 67 out of the path of its coöperating cam-block 66. This movement of the tappet is against the tension of its spring and will not affect the position of the shaft 46, upon which the tappet is loosely mounted, so as to be permitted to move independently in this direction.

To lock the repeating-key in its forward position, I provide a detaining-hook 73, with which coöperates a pin 74 on the arm 71. When the pin is engaged by this hook, the tappet is held elevated and the key 72 in a forward position. Under these conditions repeated operations of the handle will result in placing an example set up on the keyboard in the adding-wheels any desired number of times. By pressing the repeating-key rearwardly by hand, so as to release the tappet 67, the next operation of the operating-handle will release the keyboard if the correction-key hereinbefore described has not been operated to accomplish this result, operating the total-key, will raise the frame 36 and its bar 35, and mechanically release the repeating-key, as will hereinafter be described.

*Locking the operating-handle.*—75 indicates a lever provided with a shoulder or hook, said lever being held normally in such position that said shoulder or hook will engage the foremost recess of the sector 54 and lock the operating-handle in a forward position.

It has been stated that the operating-handle is yieldingly connected to the driving-shaft 53, from which driving-shaft are operated the several mechanisms in the machine. This yielding connection is through the medium of spring 59. In the event that the operating-handle is suddenly jerked forward the double pawl 55 will serve to compel a complete stroke; but should it happen that the operating-handle reached its forward limit of movement before the spring 59 has had time to act, and consequently before the arms 52 have permitted the slide-bars to move to their full limit of movement and the operating-handle is attempted to be moved rearwardly by the operator, the hook-lever 75 will prevent such return movement by engaging the first recess in the sector 54. In this manner the sector and its connected operating-handle are held in their forward position until the spring 59 has recovered the lost ground occasioned by the speedy forward movement of the handle and has placed all of the slide-bars in proper position. Coincident with this the bar 62, which is also driven by the spring 59, will have been moved forwardly to perform its several functions, and upon approaching the limit of this forward movement a pin 76, carried by said bar, will engage the hook-lever 75 and force it out of its locked position with respect to the sector 54. The handle being now released can be moved rearwardly.

In the ordinary operation of the machine when the spring 59 causes the post 58 to hug the rear wall of the slot at all times the rod 62 will, through its pin 76, move the hook-lever 75 out of the path of the sector and prevent the handle from becoming locked in its forward position. It is only when the handle is jerked forward to place the spring 59 under greater tension that the hook-lever 75 becomes operative, and under these conditions only for such time as will enable the spring 59 to act properly, placing the various devices in proper position, after which the operating-handle is released.

*Governing the return movement of the handle.*—The rear end of rod 62 is provided with teeth, with which meshes a segmental gear 77. (See Figs. 14 and 15. This segmental gear is mounted upon a shaft 78, which shaft carries a rock-arm 79. A link 80 connects this rock-arm with a lever 81. The forward end of lever 81 coöperates with a transferring mechanism hereinafter described, while the rear end of said lever is connected to the rod of a plunger arranged in a dash-pot 82. Oil is preferably used in this dash-pot, and the return movement of the handle, which forces the plunger downwardly on the dash-pot, causes said oil to pass through a restricted opening in escaping from under the plunger. The speed at which the operating-handle and its connected parts may move when the handle is on its return stroke is thus governed and cushioned.

The rod 62 is provided with a cushion 83, acting as a buffer, said cushion in the home position of the rod coöperating with one of the vertical members of the right-hand frame-plate.

*Engaging the slide-bars with the adding-wheels.*—Each of the slide-bars 25 has pivoted to it a slotted rack 84, through the slots of which passes a rod 85, mounted in the ends of rock-arms forming a rocking frame, whose axis of movement is the rod 86. On one of the side arms of this frame is a cam-roller 87, (see Figs. 5 and 8,) which cam-roller is received in a cam-slot in an arm 88, loosely mounted upon the shaft 53 and preferably adjacent the left-hand frame-plate. This cam-slot is so formed that when the arm 88 is rocked forwardly the rod 85 will lift all of the pivoted racks into engagement with the adding-wheels.

The arm 88 in the ordinary operation of the machine is operated from the shaft 78, (see Fig. 6,) which shaft has mounted upon it an arm 89, provided with a curved extension carrying pins or projections 90 and 91. These pins or projections coöperate with a rock-arm 92, which is connected by a link 93 to the arm 88.

When an example is set up on the keyboard, the forward movement of the handle permits the slide-bars to move to their adjusted positions, respectively, and when the slide-bars have reached their extreme forward position (the greatest length of movement being when the "9" key is depressed) the projection 91 engages the arm 92 and a continued forward movement of the handle will now operate the arm 88, so as to engage all of the pivoted racks with their respective adding-wheels. When in this engaged position, the arm 88 is stationary during the major part of the return movement of the handle, during which time the slide-bars are restored and in so being restored are operating the adding-wheels. When the slide-bars are fully restored, the final movement of the handle causes the projection 90 to engage the arm 92 and rock the arm 88, so as to depress the pivoted racks and disengage said racks from the adding-wheels. Thus the slide-bars are free to be again moved forwardly in the ordinary operation of the machine when it is desired to put another example in the adding mechanism. Means are also provided to operate the arm 88 upon the actuation of the total-key, as will hereinafter appear.

*The adding mechanism.*—The adding mechanism, including the transferring devices, are preferably mounted in removable side frames 94, secured to the side-frame plates of the machine. In the side frames 94 are mounted shafts 95 and 96, the former having arranged upon it gears 97, with which mesh pinions 98, having conjoined to them the indicator-disks 99. Gears 97 are shown as having thirty teeth, while the pinions 98 have ten teeth. The indicator-disks bear numbers from "1" to "9," inclusive, and also the zero character. The gears 97 are driven by the pivoted racks 84, and each gear has a three-pointed star 100 conjoined to it, (see Fig. 8,) the points of which star-shaped plate are equivalent to three pins on the gear. These points are equidistantly spaced apart, and the distance between each part is represented by ten teeth on the gear. It is obvious that the gears 97 may have but ten teeth or any desired number of teeth which number is a multiple of ten. This statement of course only applies where the machine is to be used in connection with the decimal system.

*Locking the adding-wheels.*—101 indicates detaining-pawls mounted upon a suitable shaft and held against the adding-wheels by appropriate springs. These pawls are provided with projections which coöperate with a rod 102, mounted in the ends of swinging arms. This rod is moved in an arc of a circle about its axis of rotation through the medium of a link 103, which has a slot-and-pin connection with the arm 88. Thus upon the approach of its forward limit of movement by said arm 88 the rod 102 is swung forwardly and all of the adding-wheels are released. Just prior to the release of the adding-wheels by the pawls 101 the pivoted racks 84 are thrown into engagement therewith. Upon the backward movement of the arm 88 the pawls 101 are engaged with the adding-wheels before the pivoted racks are disengaged therefrom and after the slide-bars are brought to a position of rest.

*The zero-stops.*—Preferably upon the shaft which carries the pawls 101 is mounted a series of spring-pressed arms 104, whose free ends are formed with shoulders coöperating with the points of the star-shaped plate conjoined to the adding-wheels. When any point of the star is arrested by the shoulder on the arm 104, the zero position of the adding-wheel and its associate indicator-wheel is established. Means are provided for arresting the inward movement of the arm 104, whereby said arm is in normal operative position.

*Transferring devices.*—105 indicates a shaft mounted in the side frames of the adding mechanism, which shaft forms the pivotal support for a rocking frame 106. The rocking frame carries a cross-bar 107 at its upper end, in which is arranged a series of spring-posts 108, to which springs 109 are connected, the opposite ends of said springs being connected to pawl-carrying frame-plates 110. These frame-plates have mounted upon them the driving dogs or pawls 111, which coöperate with the adding-wheels in such manner that when a train of lower order is rotated a distance exceeding nine teeth the pawl 111 is placed in position to coöperate with the next adjacent train of higher order and drive the same a distance of one tooth. A spring 112 tends to hold the free end of the pawl 111 down at all times, said spring permitting said pawl to rise in riding over a tooth when the frame-plate is recovered.

At each forward movement of the handle the frame 106 is moved rearwardly by means of a link 113, pivotally connected thereto and to a bell-crank lever 114, mounted upon the rear end of the left-hand frame-plate. This bell-crank lever carries a cam-roller which coöperates with a curved flange 115 and a cam projection 116, both of which are carried by the arm 89, before referred to. When the handle is moved forwardly, the cam-roller follows the flange 115 and permits the springs 109 to draw the frame 106 rearwardly. This rearward movement of frame 106 causes a projection 117, carried thereby, to engage and vibrate a frame 118. A spring 119 (see Fig. 8) opposes the backward movement of frame 118, and when the projection 117 is in engagement with the frame 118 said spring 119 causes the cam-roller to leave flange 115 and ride upon the upper face of the cam projection 116. A continued movement of the handle in a forward direction will cause the cam-roller on the bell-crank lever 114 to ride past and under the cam projection 116, so that when the handle starts on its return movement the cam-roller is forced to ride along the inner face of the cam projection 116, which acts to gradually depress the forward end of lever 114 until the cam-roller again occupies its normal position under the flange 115, as shown in Fig. 8.

The frame 118 referred to by reason of the tension of its spring 119 is held in a forward position, which forward position is determined by a stop-pin 120, carried by said frame, coöperating with a projection on the side frame of the accumulating mechanism.

The frame 118 at its upper end carries a rod 121, upon which rod are mounted a series of shouldered tripping-pawls 122.

123 indicates pins on the pawl-carrying frames, which coöperate with the shoulders of the tripping-pawls. The free ends of these tripping-pawls coöperate with the points of the star-plate identified with the train of lower order.

Each pawl-carrying frame carries a projection 124, which coöperates with the teeth of the adding-wheel driven by its carried pawl. This projection is designed to be forced into engagement with the teeth when the pawl has completed its driving movement for the purpose of preventing said pawl from overthrowing the adding-wheel.

125 indicates a rock-shaft mounted in the upper ends of the side frames of the accumulator, which rock-shaft carries a plate 126, designed to coöperate with and restrain the forward movement of the pawl-carrying frame-plates until the operating-handle is approaching the limit of its rearward movement. The lever 81 before described, which has connected to it the plunger of the dash-pot, operates and rocks the shaft 125, elevating the free end of the plate 126 above and out of the path of the pawl-carrying plates 110 when the handle is in normal position.

By the above construction the transferring devices are set by their respective trains ready to operate the next adjacent train of higher order, the rocking plate 126 restraining such operation of the trains of higher order until the handle has reached its home position and raised the plate 126. Thus when the handle is home the trains of higher order are driven through the medium of the springs 109, the detaining-pawls 101, above referred to, permitting the trains to be driven in this manner. The carrying devices do not interfere with the ordinary operation of placing an item in the adding-wheels. At the end of each of such operations, however, if any of the adding-wheels have tripped the pawl-carrying plates the springs 109 will become effective when the plate 126 is raised, and thus the carrying from one adding-wheel to the next adjacent adding-wheel of higher order results. It will be seen in this connection that it is not necessary to give to the operating-handle a second operation to effect the carrying before taking a total, as the adding-wheels at all times stand fully carried and the indicator-wheels at all times exhibit a correct total. Of course it is necessary for the operating-handle to be operated to reset the pawl-carrying frames; but this resetting action may be coincident with the taking of a total, as the driving-pawls 111 do not in any way interfere with the taking of a total, they being raised out of engagement before the wheels are reversely rotated.

Referring now to Figs. 18, 19, and 20, the normal position of the transferring devices is that illustrated in Fig. 18. When a train is driven a distance of ten teeth, one of the points of the star will lift the tripping-dog 122 and release the pawl-carrying frame identified with the train of higher order. The release of this pawl-carrying frame can only occur when the handle has been moved forwardly, in which event the plate 126 is in the path of the pawl-carrying frame, preventing said pawl-carrying frame from moving forwardly. When the handle is returned to its home position and the plate 126 is elevated, the pawl-carrying frame swings forwardly and its pawl 111 drives the train of higher order, the parts finally occupying the position shown in Fig. 20. In this position the parts will remain until the handle is moved forwardly, and, as before described, the initial movement of the handle rocks the frame 106 rearwardly, the bar 107 thereof engaging and moving backwardly all of the tripped pawl-carrying frames 110 until they occupy a position behind the plate 126. This plate now drops in front of the pawl-carrying frames, holding them retracted. Coincidently with this restoration of the pawl-carrying plates the shoulders of the tripping-dogs drop in front of the pins 123, so that upon the next elevation of the plate 126, if the tripping-dogs have not in the meantime been operated, the pawl-carrying frames will be held in a retracted position by the tripping-dogs. After the tripping-dogs operatively engage the pins 123 the frames 110 continue their rearward movement, so as to insure the pins dropping behind the shoulders of the tripping-dogs, and then the projections 117 engage the rod 121 and rock the frame 118 rearwardly. This rocking of frame 118 results in vibrating all of the dogs 122, moving them temporarily out of the paths of the tripping projections 100. Referring to Fig. 18, it will be observed that in the rotation of the adding-wheel to the left the tripping projection will operate the pawl 122. If a total is now taken, the tripping projection will move to the right until it is brought to a position of rest by the zero-arms 104. In this position the tripping projection nearest the tripping-pawl 122 will be above said pawl, and consequently the frame 118 and its carried tripping-pawls upon being vibrated will move the tripping-pawls out of the paths of the tripping projections, so that the tripping-pawls can be reset, and when the frame is returned to its normal position said tripping-pawls will be properly positioned over the tripping projections, as shown in Fig. 18, ready to be tripped upon the next operation. Another object in vibrating the pawl-carrying frame 118, so as to move the tripping-pawls out of the paths of movement of the tripping projections, is to prevent the repeated and untimely operations of the transferring driving-pawls. To illustrate this, we will assume that in Fig. 18 the adding-wheel stands at "9" and is moved one point, so that "0" is exhibited. The tripping projection still occupies its position under the tripping-pawl, although the frame 110 bears against the plate 126, which means that when the handle completes its rearward movement said frame will move forwardly to cause its driving-pawl 111 to actuate the next adjacent adding-wheel of higher order a distance of one tooth. Upon the next operation of the handle the bar 107 will engage the frame 110 and move the same rearwardly, so as to locate the pin 123 behind the shoulder of the pawl; but by reason of the tripping projection remaining under the tripping-pawl the tripping-pawl will still remain elevated, and if the frame 118, which carries the tripping-pawl, was not vibrated to move the tripping-pawl off of the tripping projection, so that it is in a position to engage the pin 123 and drop beneath the tripping projection, the plate 110, controlled by said formerly-elevated tripping-pawl, would when next released upon the elevation of the plate 126 drive the next adjacent adding-wheel of higher order one tooth. From this it will be seen that it is important to vibrate the frame which carries the tripping-pawl to enable said pawl to be restored to normal position upon the next operation of the handle, so as to insure the proper operation of the transferring mechanism. A spring 127 is connected to the rock-shaft 125, (see Fig. 14,) which tends to depress the plate 126 at all times. A suitable stop is provided for determining the depressed position of said plate.

*The printing or recording devices.*—Each of the slide-bars 25 carries a type-frame 128 at its rear end, in which are mounted independently-movable type 129. These type coöperate with a spring-finger 130 in the manner shown and described in my former patent. Type-hammers 131 serve to drive the type in the printing-line against a type-ribbon 132, whereby an impression is made upon a sheet or strip of paper arranged to travel under a rotatable platen 133, mounted in a carriage adjustable across the top of the machine. (See Fig. 2.) This carriage is preferably so constructed that it can be adjusted in different positions transversely the machine, whereby a number of columns can be printed side by side on the same sheet of paper. Suitable means are provided for rotating the platen step by step at each operation of the handle. The inking-ribbon is mounted upon suitable spools whose position may be shifted upon the operation of the total-key, and means are provided for automatically reversing the feed of the ribbon. This inking-ribbon is multi-colored, so that in the normal position of the spools when the items are printed upon the sheet of paper said items appear in one color. When the total-key is operated to obtain a total, the spools are shifted and another color is placed above the printing-line, so that when the total is printed it appears in a color different from that of the items of which it is composed. This construction is fully shown and described in my former patent, and I do not deem it necessary in this application to give a more detailed description than the above.

The type-hammers referred to are each provided with a member carrying two pins or projections 134 and 135, with which coöperate pawls 137 and 136. The pawls 136 have forward extensions which coöperate with pins 138 on the type-frames, whereby when any slide-bar is actuated the pin 138 operates the pawl 136 and initially releases the type-hammer controlled thereby. Pawls 136 also carry lateral projections 139, which coöperate with the adjacent pawl identified with the column of lower order in a manner shown and described in my former patent for the purpose of initially releasing the type-hammers in the columns of lower order, so that said type-hammers will print the zero characters in a manner well understood in this art. The pawls 137 are temporarily displaced by means of a rod 140 when the handle approaches the forward limit of its movement, whereby those type-hammers which have been initially released by the pawls 136 deliver an impacting blow and make a printing impression upon the sheet of paper. Of course those type-hammers which have not been released by the pawls 136 cannot strike a blow, notwithstanding the displacement of their coöperating pawls 137. The rod 140 referred to is mounted in the ends of arms 141 (see Fig. 14) and projects through the frame-plates 142, which house the printing mechanism. To one of these arms 141 is connected a link 143, the lower end of which link has a slot-and-pin connection with a segmental cam-plate 144, mounted upon shaft 78. When shaft 78 is rocked the initial movement thereof will not actuate the link 143. However, the rod 140 is depressed by means of this link, its final movement in a downward direction displacing the pawls 137. This displacement of the pawls does not occur until all of the slide-bars have reached their designed position as controlled by the keyboard, in which position the proper type are located in the printing-line. The cam-segment 144 referred to is provided with a slot, in which operates a projection extending from a bell-crank lever 145. This bell-crank lever is rocked when the handle is approaching the limit of its forward movement, and such operation is utilized to depress a bar 146, carried by the bell-crank lever into engagement with a rack 147, extending rearwardly from the type-frames. This bar 146 may be termed a "centering-bar" as it serves to aline the type in the printing-line, and at the same time lock the printing-frames firmly in position during the printing impression. The initial movement to the rear of the operating-handle releases the type-frames, (and the slide-bars,) so that this centering-bar 146 will not interfere with the restoration of the slide-bars and the placing of the item in the adding-wheels.

*Obtaining the total.*—After a series of items have been placed in the adding-wheels in the ordinary operation of the machine, if it is desired to obtain a total a total key or lever 148, pivotally mounted at the front end of the machine and preferably adjacent the left-hand frame-plate, is manipulated. While this total-key is held forward, the handle is operated and the total is printed as a footing to the column of items. If the total-key is released upon the operation of the handle, it will fly back when the handle reaches the limit of its forward stroke and the adding-wheels will be cleared. The return movement of the handle will set the parts of the machine in normal position. If it is desired to retain the total in the adding-wheels, the total-key is held forward and the handle returned to its normal position, after which, the total-key is released. In this manner the total can be printed and the machine cleared, or the total can be printed and retained in the machine at the will of the operator.

Upon the operation of the total-key the following actions result: All of the slide-bars are released; the keyboard if an example is set up therein, is released, and prevented from being operated while the total-key is in other than a normal position; devices are set into position to engage and restrain unnecessary forward movement of the slide-bars; a lock is operatively positioned to prevent the restoration of the total-key until the handle has completed, at least, its forward movement; the pivoted racks are engaged with the adding-wheels; the means ordinarily operated by the handle (when the total-key is home) to engage the racks with the adding-wheels is rendered inoperative, and the ribbon-spools are shifted so that the total is printed in a color different from that of which its items are composed.

*Releasing the slide-bars.*—Connected to the total lever or key 148 is a link 149, whose opposite end is connected to a rocking lever 150. This rocking lever 150 is provided with a pin 151, (see Fig. 10,) which coöperates with and depresses a lever 152, fixed to the rock-shaft 38. By this construction when the total key or lever is pulled forwardly the shaft 38 is rocked and the bar 35 lifts all of the levers 32 and their associate latch-pins 33, whereby all of the slide-bars are released.

*Releasing the keyboard.*—Through the medium of a link 153, having a slot-and-pin connection with the frame 47, the fingers 50 restore all of the sliding plates 18, and if an example is set up on the keyboard at the time the total-key is manipulated the keyboard is freed before the handle is operated to obtain the total.

*Restraining forward movement of slide-bars.*—The rocking of the shaft 38 also depresses an arm 154, which carries at its rear end a projection overlapping a lever 155. This lever is pivoted upon a rod 156, (see Fig. 4,) its rear end being held elevated by means of a spring 157. A slotted guiding-post 158 receives and guides the forward end of this lever. The rear end of lever 155 is provided with a projection 159, above which is a vertical face designed to coöperate with a pin 160, extending from the restoring-arm 52 at the left end of the shaft 53.

In the normal position of the total-key the end of lever 155 is out of the path of the pin 160. When the total-key is operated, the rear end of this lever 155 is depressed into the path of the pin 160, and when the handle is operated the lever is moved forward bodily, so as to rock a frame 161, mounted in suitable bearings extending up from the base-casting 1. The pivot-rod 162 of this frame forms a support for a series of pawls 163, whose upper faces are slotted to receive the rod upon which the lever 155 is pivoted, appropriate springs tending to hold the free ends of the pawls 163 in an elevated position. The lower edge of each slide-bar is notched or formed with a series of teeth 164, which are designed to be engaged by the pawls 163. The purpose of this is to prevent the slide-bars when disengaged from the adding-wheels from flying forward to the full limit of their movement as determined by the position of the restoring-arms 52.

To better illustrate the purpose and function of these pawls 163, I will state that when the total-key is operated the pivoted racks are thrown into engagement with the adding-wheels before the handle is operated. When the handle is pulled forward, the adding-wheels are reversely rotated until a zero position is reached. Thus the slide-bars move forwardly the distance permitted by the reverse rotation of the adding-wheels. When the handle reaches the limit of its forward movement, should it be desired to retain the total in the adding-wheels the total-key is held depressed, so as to keep the racks in engagement with the adding-wheels, the return movement of the handle rotating said adding-wheels the same distance in a forward direction as they had previously been rotated in a backward direction. However, if it is desired to clear the machine when all of the adding-wheels are at zero the total-key unless held will automatically be restored and this movement will disengage the pivoted racks from the adding-wheels before the handle starts on its return movement. As all of the slide-bars stand released and as the handle is in a forward position when the racks are disengaged from the adding-wheels, were it not for the pawls 163 there would be nothing to prevent all of the slide-bars from moving forward to their extreme position. The pawls 163 are thrown into engagement with the slide-bars after the slide-bars have been moved to the full limit of their forward movement in the act of taking the total, and should it be desired to clear the machine the total-key can rise, the racks becoming disengaged from the adding-wheels; but the slide-bars cannot move forwardly because of the restraint imposed upon them by the pawls 163. In restoring the slide-bars upon the return movement of the handle the pawls 163 are held elevated and in engagement with the teeth of the slide-bars until just before the handle reaches its home position, when the latch-pins 33 will be in readiness to engage the slide-bars, as in the ordinary operation of the machine. In Figs. 4 and 5 I have shown the parts in the position they occupy when the total-key is in normal position. In Fig. 10 I have shown the position occupied by the parts when the total-key has been moved rearwardly. Fig. 10, however, does not show the lever 155 moved to its forward position to raise the pawls 163 into engagement with the rack-bars, because the handle in Fig. 10 is supposed to have not been moved.

*Interlock between the total-key and the operating-handle.*—The lever 150 in addition to the above is provided with a roller 165, which coöperates with the concentric track-plate formed on an arm 166, secured to the main drive-shaft 6. When the lever 150 is in normal position, as shown in Fig. 4, this roller 165 is below the track-plate, and upon the initial movement of the handle the track will pass over the roller, and in this manner the total-key is locked against operation when the handle is in other than a normal position. Likewise when the total-key is actuated the roller 165 is elevated, and upon the initial movement of the handle the track passes under the roller, so as to prevent the total-key from being restored after the operation of taking the total has commenced and the handle has been moved. There is nothing to prevent the idle manipulation of the total-key; but when the total-key is moved and the handle pulled forward the operation of taking the total must be carried on to completion. As stated before, the total can be retained in the machine, if desired, or the machine cleared; but in any event the operation of taking the total must be completed. To prevent the total-key from being operated when the handle is in its forward position, I provide a yielding dog 167 on the rear end of the track. This dog will not prevent the roller 165 from passing from the upper face of the track to a position under the lower face of said track; but when the roller is in such lowered position the total-key cannot be operated, when the handle is in a forward position, to restore the roller to its position above the track. When the total is taken and it is desired to hold the total in the machine, the total-key must be held down by hand; otherwise if the total-key is released when the handle reaches its forward position the roller will drop behind the track past the dog 167, which movement of lever 150 results in disengaging the racks from the adding-wheels, and to prevent a false total appearing in the adding-wheels, which might result if the total-key was operated to again engage the racks with the adding-wheels, I prefer to prevent any operation of the total-key when the handle is in a forward position or in any position other than a home position.

*Engaging the racks with the adding-wheels.*—To engage the pivoted racks with the adding-wheels, upon the operation of the total-key a link 168 connects the lever 150 with the arm 88. The rear end of this link is formed with an inverted-L-shaped slot, which coöperates with a stud 169 on the lever 88. In the normal position of the machine when the total-key is in normal position the stud plays in the horizontal member of this slot; but when the total-key is operated, as shown in Fig. 10, the rear end of lever 168 is elevated so as to locate the stud in the vertical member of the slot, the normal position of the parts being such that this stud registers with the vertical member of the slot. (See Fig. 5.) The initial movement of the total-key locates the stud in the vertical member of the slot, and the continued movement of said total-key causes the arm 88 to be rocked and the pivoted racks to be thrown into engagement with the adding-wheels. The elevation of the rear end of lever 168 through the medium of a T-shaped pin 169ᵃ on the forward end of link 93 (see Fig. 8) raises said link out of engagement with the arm 88. The engagement between link 93 and arm 88 is through the medium of a pin 170 on the arm 88, which is received in a recess in the lower forward edge of link 93. Thus when the total-key is operated the link 93 is disengaged from the arm 88, so that the operation of the handle, which would ordinarily rock the arm 88 to engage the pivoted racks with the adding-wheels through the medium of link 93 at the conclusion of its forward movement, said link holding the racks in engagement with the adding-wheels until the handle approached the limit of its rearward movement, will under the conditions established by the operation of the total-key be inoperative. Thus the ordinary means of operating the arm 88 are inoperative when the total-key is operated and will not interfere with the operation of said arm 88 by the total-key.

*Shifting the ribbon-spools.*—171 is a link connected to the rear end of lever 168 and to a bell-crank lever 172. This bell-crank lever is connected by a link 173 to a rock-arm on a shaft 174. This shaft carries arms 175, (see Fig. 6,) which are connected by links to the ribbon-spools, whereby when the total-key is operated the ribbon-spools are shifted so as to present a ribbon over the printing-line having a color different from that which normally lies over the printing-line. In this way the total is printed in a color different from that of which its items are composed.

*Releasing the adding-wheels by the operation of the total-key.*—As before stated, the adding-wheels when disengaged from the pivoted racks may be moved by the transferring-pawls; but the pawls 101 tend to prevent any accidental rotation of said wheels. These pawls 101 are lifted from the adding-wheels whenever the arm 88 is rocked to engage the pivoted racks with the adding-wheels. As this arm 88 is rocked by the total-key, as hereinbefore described, it follows that the pawls 101 are by such operation lowered from the adding-wheels to release said adding-wheels when the pivoted racks are engaged therewith in the operation of taking a total.

*Preventing operation of the repeating-key.*—Referring to Fig. 12, it will be seen that the detaining-hook 73, which coöperates with the repeating key or lever to lock the same in its set position, is provided with a lateral projection 73ª, which is in the path of movement of the frame 36. When the total-key is operated and the frame 36 raised, the detaining-hook 73 will be elevated, and the repeating-key cannot be locked in its set position. Were the repeating-key held forwardly by hand, it would not affect the operation of taking a total, because upon the initial operation of the total-key the keyboard is restored and the tappet 67 is idly vibrated when the handle is operated to take a total. By holding the repeating-key forward during the taking of a total and until after the handle has been restored the repeating-key will merely be set in position to cause the next example set up on the keyboard to be repeated in the machine upon the successive operations of the handle. In no way can it interfere with the taking of a total. If the repeating-key is locked in its forward position and the total-key operated, the total-key will release the repeating-key, so as to reset the keyboard to normal position before the total is obtained. When the total is obtained, the repeating-key will be in its normal position.

I am aware that many minor changes in the construction, arrangement, and combination of the several parts of my device can be made and substituted for those herein shown and described without in the least departing from the nature and principle of my invention.

Having thus described my invention, what I claim, and desire to secure by Letters Patent, is—

1. In a machine of the character described, the combination with a series of depressible keys having shanks, one edge of each shank having two notches, of a slidable plate designed to coöperate with said notches, a rocking lever for each key, which lever, upon the depression of its key, moves said sliding plate, whereby the sliding plate enters notches in all of the key-shanks locking the operated key in its depressed position and the remaining keys in their elevated position; substantially as described.

2. In a machine of the character described, the combination with a series of independently-operable keys, each of which has a shank provided with a lateral projection, said shank having two notches in one edge thereof, of a pivoted dog coöperating with said lateral projection, a spring coöperating with said dog to hold the same and its associate key in normal position, a heel portion on said dog, and a slidable plate coöperating with said heel portion and with the notches in the key-shank; substantially as described.

3. In a machine of the character described, the combination with a series of keys, each of which is provided with a lateral projection, of spring-pressed dogs coöperating with said lateral projections, each of said dogs having a heel portion, a notched sliding plate having projections in the paths of said heel portions, and means for yieldingly holding said sliding plate in its adjusted positions; substantially as described.

4. In a machine of the character described, the combination with a series of independently-movable keys whose shanks are provided with recesses 20 and 21, of a sliding plate normally in register with the notches 21, said sliding plate having projections, pivoted spring-pressed dogs coöperating with the key-shanks and coöperating with said projections, whereby, when any key of the series is depressed, its dog is operated to drive the plate forwardly to lock said key in its depressed position and the remaining keys in their elevated positions, and a yielding medium for holding said sliding plate in its forward position; substantially as described.

5. In a machine of the character described, the combination with a series of keys, of a sliding plate common thereto, and a spring carried by said sliding plate, said spring being provided with oppositely-inclined portions for coöperating with a stationary abutment, whereby said sliding plate is yieldingly held in its adjusted positions; substantially as described.

6. In a machine of the character described, the combination with a series of keys, each of which is provided with a lateral projection 13, notches 20 and 21, and a slot 22, of rods or wires passing through said slot for holding the key against vertical displacement, spring-pressed pivoted dogs coöperating with the projections 13, a recessed sliding plate 18 which is actuated by any key in the series through the medium of its dog, and a leaf-spring 24 carried by the sliding plate for holding said sliding plate in its adjusted positions; substantially as described.

7. In a machine of the character described, the combination with a keyboard comprising series of depressible keys, of sliding plates common to their respective series of keys, a rocking frame for restoring said sliding plates, a handle for rocking said frame, and a lever carrying a cam projection for rocking said frame independently of said handle; substantially as described.

8. In a machine of the character described, the combination with a keyboard comprising series of depressible keys and their associate sliding bars, of a rocking frame for restoring said sliding plates, a cam-shaft for rocking same frame, a handle for operating said cam-shaft, and a lever for rocking said cam-shaft independently of said handle; substantially as described.

9. In a machine of the character described, the combination with a keyboard, of means for restoring the same, said means comprising a rocking frame, a cam-shaft for operating said frame, a rock-arm on said shaft, and a lever provided with a cam projection for coöperating with said rock-arm; substantially as described.

10. In a machine of the character described, the combination with a keyboard, of means for restoring the same, said means comprising a rocking frame carrying fingers 50, a cam-shaft for rocking said frame, an operating-handle for rocking said cam-shaft, a rock-arm on said cam-shaft, and a lever 42 provided with a cam projection for coöperating with said rock-arm to rock said cam-shaft independently of the operating-handle; substantially as described.

11. In a machine of the character described, the combination with a series of depressible keys, of means for holding said keys in a depressed position, whereby they act as stops, a slide-bar common to said series of keys and provided with lateral projections designed to coöperate with the stops set up by the different keys in their depressed position, a rack pivoted to said slide-bar, an adding-wheel designed to mesh with said rack, an operating-handle, a spring connection between said operating-handle and said slide-bar, whereby said slide-bar is impelled forwardly until arrested by one of the depressed keys, means for throwing the rack into engagement with the adding-wheel after the slide-bar has completed its forward movement, and means controlled by the operating-handle for restraining the forward movement of the slide-bar under the action of its spring; substantially as described.

12. In a machine of the character described, the combination with a keyboard for setting up stops, of a series of slide-bars controlled by said stops, springs for moving said slide-bars forwardly, an operating-handle for restoring the slide-bars, and means controlled by said operating-handle for increasing the tension of said springs upon the movement of said operating-handle before said operating-handle restores the slide-bars; substantially as described.

13. In a machine of the character described, the combination with a keyboard for setting up stops, of slide-bars whose position is controlled thereby, springs connected at one of their ends to said slide-bars for moving said slide-bars forwardly, an operating-handle, arms controlled by said handle, to which arms the other ends of said springs are connected, and means controlled by said handle for restraining the movement of said slide-bars under the action of their respective springs; substantially as described.

14. In a machine of the character described, the combination with a keyboard for setting up stops, of slide-bars whose position is controlled by said stops, springs connected at one of their ends to said slide-bars for moving said slide-bars against said stops, an operating-handle, arms controlled by said handle, to which arms the other ends of said springs are connected, and means controlled by said operating-handle for moving the arms forwardly and for restraining the movement of the slide-bars under the action of their impelling-springs; substantially as described.

15. In a machine of the character described, the combination with slide-bars, springs for moving said bars forwardly, of an operating-handle, and means controlled by said operating-handle for increasing the tension of the springs which move the slide-bars forwardly and for restraining the movement of said slide-bars and preventing said slide-bars moving under the impelling action of their springs until said handle is operated, said restraining means also serving to restore the slide-bars to normal position; substantially as described.

16. In a machine of the character described, the combination with a series of adding-wheels, of a series of independently-movable keys for each wheel, key-stops, a slide-bar common to said series of keys and provided with lateral projections coöperating with the key-stops, a rack pivoted to said slide-bar, an operating-handle, a yielding connection between said operating-handle and said slide-bars, whereby said slide-bars are moved forwardly by said yielding connection until arresting by one of the key-stops, means controlled by the operating-handle for restraining the forward movement of the slide-bar, means operated by said handle for throwing the racks into engagement with the adding-wheels after the slide-bars have completed their forward movement, the restraining devices restoring the slide-bars and rotating the meshed adding-wheels, and means for disengaging the racks on the slide-bars from the adding-wheels when the operating-handle reaches the limit of its return movement; substantially as described.

17. In a machine of the character described, the combination with a keyboard, of means for restoring the same, said means including a tappet, a repeating-key for rendering said tappet inoperative, and a hook-lever for locking said repeating-key in position; substantially as described.

18. In a machine of the character described, the combination with a keyboard and its restoring means, said restoring means including a tappet, of a repeating-key for swinging said tappet out of operative position, a hook-lever for locking said repeating-key in its engaged position with said tappet, and means for rendering said hook-lever inoperative; substantially as described.

19. In a machine of the character described, the combination with a keyboard and its restoring means, said restoring means including a tappet, of a repeating-key for swinging said tappet out of operative position, a hook-lever for locking said repeating-key in its engaged position with said tappet, and a total-key for rendering said lever inoperative; substantially as described.

20. In a machine of the character described, the combination with a main shaft, of a handle for operating the same, a notched segment on said main shaft, a double pawl coöperating with the notches in said segment, a sliding bar operated by said shaft, and means on said sliding bar for throwing the double pawl; substantially as described.

21. In a machine of the character described, the combination with a main shaft, of a handle for operating the same, a bar reciprocated by said main shaft, a notched segment on said shaft, a double pawl coöperating with said notched segment and having a tappet, and projections on said reciprocating bar for coöperating with said tappet and throwing said double pawl; substantially as described.

22. In a machine of the character described, the combination with a positively-driven shaft, of an operating-shaft yieldingly driven therefrom, and means for locking the positively-driven shaft in one position until the yieldingly-driven shaft occupies a proper relation to the positively-driven shaft; substantially as described.

23. In a machine of the character described, the combination with a positively-driven shaft, of an operating-shaft yieldingly driven therefrom, means for locking the positively-driven shaft in one position in the event that its relation to the operating-shaft is changed, and means operated by the said operating-shaft to release the positively-driven shaft when the yieldingly-driven operating-shaft occupies proper relation to the positively-driven shaft; substantially as described.

24. In a machine of the character described, the combination with a positively-driven main shaft carrying a notched segment, of a hook-lever for engaging said notched segment and locking the same in one position, a shaft yieldingly driven from said main shaft, and means operated by said yieldingly-driven shaft for rendering said hook-lever inoperative; substantially as described.

25. In a machine of the character described, the combination with a positively-driven shaft, of a notched segment carried thereby, a spring-post on said notched segment, a spring connected to said post, a link having a bifurcated end through which said post passes, said spring being connected at its other end to said link, a sliding bar upon which said link is pivotally mounted, and a rock-shaft carrying a rock-arm which coöperates with said sliding bar; substantially as described.

26. In a machine of the character described, the combination with a positively-driven shaft, of a notched segment carried thereby, a hook-lever normally in the path of said notched segment and designed to lock the same in one position, a sliding bar, a bifurcated bar mounted on said sliding bar, and having a yielding connection with said notched segment, and means on said sliding bar for rendering said hook-lever inoperative; substantially as described.

27. In a machine of the character described, the combination with a positively-driven main shaft, of a notched segment mounted thereon, a double pawl coöperating with said notched segment to compel a complete movement being imparted to said positively-driven shaft, a sliding bar operated by said main shaft, means carried by said sliding bar for throwing said double pawl, a hook-lever normally in position to lock the main shaft in one position, and means carried by said sliding bar for rendering said hook-lever inoperative; substantially as described.

28. In a machine of the character described, the combination with an adding-wheel carrying tripping projections of a vibrating frame, a tripping-pawl mounted on said frame and extending in the path of said projections, a spring-pressed frame controlled by said tripping-pawl, a driving-pawl mounted on said spring-pressed frame for coöperating with the next adjacent wheel of higher order, and means for holding said spring-pressed frame in a retracted position until after the adding-wheels have reached their designed position of rest; substantially as described.

29. In a machine of the character described, the combination with a series of adding-wheels carrying tripping projections, of a rocking frame, tripping-pawls mounted on said rocking frame and extending in the paths of said tripping projections, spring-pressed frames controlled by said tripping-pawls, driving-pawls mounted on said spring-pressed frames for driving the next adjacent driving-wheels of higher order, and means for holding all the said spring-pressed frames in a retracted position during the operation of the adding-wheels, said means releasing said frames whereby their carried pawls become operative; substantially as described.

30. In a machine of the character described, the combination with a series of adding-wheels and means for driving the same, of tripping projections on said wheels, a rocking frame, tripping-pawls carried by said rocking frame and extending in the paths of said tripping projections, spring-pressed pawl-carrying frames normally held in a retracted position, means for releasing said frames, and a vibrating plate operated by the driving mechanism of the adding-wheels for holding said frames retracted until the driving mechanism for the wheels has completed its movement when said plate is moved out of the paths of said frames permitting those which have been tripped to move quickly forward without restraint; substantially as described.

31. In a machine of the character described, the combination with a series of adding-wheels carrying tripping projections, of a rocking frame carrying tripping-pawls coöperating with said projections, rocking pawl-carrying frame-plates controlled by said tripping-pawls, and means for restoring the pawl-carrying frame-plates and coincidentally resetting the tripping-pawls; substantially as described.

32. In a machine of the character described, the combination with a series of adding-wheels carrying tripping projections, driving-springs and of pivoted frame-plates carrying driving-pawls, a rocking frame to which are connected the driving-springs for the pawl-carrying frame-plates, and a rocking frame carrying tripping-pawls for controlling the rocking frame-plates; substantially as described.

33. In a machine of the character described, the combination with adding-wheels carrying tripping projections, of transferring devices coöperating therewith, a rocking frame to which are connected springs for placing said transferring devices under tension, a bell-crank lever connected to said rocking frame, and a cam 116 coöperating with said bell-crank lever; substantially as described.

34. In a machine of the character described, the combination with adding-wheels, of transferring devices coöperating therewith, in which transferring devices is included a rocking frame 106, a link connected to said rocking frame, a bell-crank lever connected to said link, a rock-arm 89, a flange 115 on said rock-arm, and a cam 116 on said rock-arm, said flange and cam coöperating with said bell-crank lever; substantially as described.

35. In a machine of the character described, the combination with adding-wheels, of transferring devices including a rocking frame which places the transferring devices under tension, a rocking frame carrying tripping-pawls, and means controlled by the first-mentioned frame for restoring the tripping-pawls and their carrying-frame and at the same time relieve them of tension and restoring them to normal position; substantially as described.

36. In a machine of the character described, the combination with adding-wheels, of transferring devices including a rocking frame 106 which places the transferring devices under tension, a rocking frame 118 carrying tripping-pawls, and a projection 117 on the frame 106 for restoring the frame 118 and its carried tripping-pawls; substantially as described.

37. In a machine of the character described, the combination with adding-wheels carrying tripping projections, of tripping-pawls in the paths of said projections, a rocking frame which carries said tripping-pawls, a series of frame-plates 110 coöperating with said tripping-pawls, driving-pawls 111 mounted on said frame-plates 110, springs for actuating said frame-plates 110 when released by said tripping-pawls, a rocking element 126, and means for rocking said element into and out of the paths of movement of the frame-plates 110; substantially as described.

38. In a machine of the character described, the combination with adding-wheels carrying tripping projections, of means for driving said adding-wheels, a rocking frame 106, frame-plates 110, springs connecting said frame-plates and said frame 106, driving-pawls 111 mounted upon the frame-plates, a rocking frame 118 carrying tripping-pawls whose free ends are in the paths of movement of the tripping projections on the adding-wheels, said tripping-pawls, in their normal position, holding the frame-plates 110 retracted, means on said frame-plates for locking the adding-wheels against movement after they are driven by the pawls 111, and a rocking plate 126 which is operated by the driving means for the adding-wheels, said plate during the operation of the adding-wheels lying in the paths of movement of the frame-plates 110, and means for rocking said plate upon the completion of the driving movement of the adding-wheels, whereby the frame-plates initially released by the tripping-pawls are permitted to drive the adding-wheels; substantially as described.

39. In a machine of the character described, the combination with adding-wheels, of transferring devices coöperating therewith, a rocking plate 126 for holding said transferring devices retracted until the adding-wheels have been driven in the ordinary way, means for driving said adding-wheels, and a dash-pot for cushioning said means, a lever carrying a plunger which operates in said dash-pot, said lever operating the rocking plate 126; substantially as described.

40. In a machine of the character described, the combination with adding-wheels, of a handle for driving the same, transferring devices coöperating with said adding-wheels, a dash-pot for cushioning the return movement of the handle, a lever to which the plunger of said dash-pot is connected, and means operated by said lever for releasing the transferring devices whereby they become operative at the completion of movement of the handle; substantially as described.

41. In a machine of the character described, the combination with adding and recording mechanism, of slide-bars for operating the same, a total key or lever, and means which are effective only when the total-key is operated for simultaneously releasing all of the control-bars and for restraining unnecessary forward movement of said slide-bars; substantially as described.

42. In a machine of the character described, the combination with a total-key, of slide-bars, means for preventing unnecessary forward movement of the slide-bars, and means operated by said total-key for rendering said first-mentioned means operative; substantially as described.

43. In a machine of the character described, the combination with slide-bars, of pivoted racks carried thereby, a handle for operating said slide-bars, adding-wheels, means operated by the handle for engaging the racks with the adding-wheels, a total-key, and means operated by the handle when the total-key is in an operative position for rendering the engagement of the racks and adding-wheels inoperative during a portion of the stroke of the operating-handle; substantially as described.

44. In a machine of the character described, the combination with slide-bars, of means for operating the same, pawls coöperating with said slide-bars, means controlling the position of said pawls and a total-key for moving said pawl-controlling mechanism to an operative position; substantially as described.

45. In a machine of the character described, the combination with slide-bars, of means for preventing unnecessary forward movement thereof, a total-key for placing said means in operative position, and an operating-handle setting said means in operative position; substantially as described.

46. In a machine of the character described, the combination with slide-bars provided with recesses, of pawls coöperating with said recesses, a lever 155 controlling the position of said pawls, a total-key coöperating with said lever, and an operating-handle also coöperating with said lever; substantially as described.

47. In a machine of the character described, the combination with slide-bars, of an operating-handle coöperating therewith, pawls for preventing unnecessary forward movement of said slide-bars, means for operating said pawls and a total-key for placing said pawl-operating mechanism in position to be operated by said operating-handle; substantially as described.

48. In a machine of the character described, the combination with spring-impelled slide-bars, of an operating-handle for restraining the forward movement of said slide-bars, said slide-bars having recesses, pawls 163 coöperating with said recesses, a lever 155 for controlling the position of said pawls, and a total-key coöperating with said lever 155 to move it into position to be operated upon the operation of said handle; substantially as described.

49. In a machine of the character described, the combination with an operating-handle, of an arm connected thereto and provided with a track-plate, a total-key, a lever operated from said total-key and having a projection designed to ride over or under said track-plate, and a dog at one end of said track-plate; substantially as described.

50. In a machine of the character described, the combination with an operating-handle, of a total-key, means for preventing the operation of the total-key when the handle is in other than normal position, said means permitting the total-key to be restored when the operating-handle is in a certain position other than home position; substantially as described.

51. In a machine of the character described, the combination with an operating-handle, of a track-plate operated thereby, a yielding dog at one end of said track-plate, and a total-key coöperating with said track-plate whereby when the handle is in a forward position the total-key is permitted to return home, the dog preventing another operation of said total-key while the handle is in a forward position; substantially as described.

52. In a machine of the character described, the combination with adding and recording mechanism, a keyboard having a repeating-key, slide-bars, and an operating-handle, of a total-key for effecting the release of all of said slide-bars; releasing the keyboard and preventing the setting up of an example on said keyboard when the total-key is in other than normal position; placing in position restraining devices for preventing unnecessary forward movement of the slide-bars; setting into position an interlock between said total-key and the operating-handle; engaging the slide-bars with the adding mechanism; shifting the inking devices of the recording mechanism whereby the total is printed in a color different from that of which its items are composed; releasing the adding-wheels; and preventing the operation of the repeating-key; substantially as described.

In testimony whereof I hereunto affix my signature, in the presence of two witnesses, this 23d day of April, 1902.

FRANK C. RINSCHE.

Witnesses:
FRANK McCOYE,
MARIE H. HUEHNER.